(12) United States Patent
Langenfeld

(10) Patent No.: US 8,313,408 B1
(45) Date of Patent: Nov. 20, 2012

(54) DRIVE ASSEMBLY

(75) Inventor: Thomas J. Langenfeld, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 198 days.

(21) Appl. No.: 12/717,709

(22) Filed: Mar. 4, 2010

Related U.S. Application Data

(60) Provisional application No. 61/233,026, filed on Aug. 11, 2009, provisional application No. 61/288,673, filed on Dec. 21, 2009.

(51) Int. Cl.
*F16H 48/06* (2006.01)

(52) U.S. Cl. .......................................... 475/230; 37/244

(58) Field of Classification Search ............ 37/244–252, 37/196, 219; 60/487, 489, 435–437, 458, 60/484–486; 91/486, 505, 418, 7; 475/23, 475/83, 74, 221, 226, 248–252, 230
See application file for complete search history.

(56) References Cited

U.S. PATENT DOCUMENTS

| | | | |
|---|---|---|---|
| 5,314,387 A * | 5/1994 | Hauser et al. ................... | 475/74 |
| 5,392,670 A * | 2/1995 | Hauser ........................ | 74/606 R |
| 6,301,885 B1 * | 10/2001 | Johnson et al. ................. | 60/487 |
| 6,651,529 B1 | 11/2003 | Poplawsli et al. | |
| 7,073,330 B1 * | 7/2006 | Hauser ............................ | 60/487 |
| 7,077,778 B1 * | 7/2006 | Irikura ........................... | 475/230 |
| 7,357,750 B2 * | 4/2008 | Okada ........................... | 475/248 |
| 7,367,353 B1 | 5/2008 | Langenfeld et al. | |
| 7,841,176 B1 * | 11/2010 | Langenfeld et al. ............ | 60/435 |
| 7,926,624 B1 * | 4/2011 | Taylor ............................ | 188/60 |
| 7,927,245 B1 * | 4/2011 | Langenfeld et al. ............ | 475/83 |
| 8,046,992 B2 * | 11/2011 | Abend et al. ................... | 60/487 |
| 2008/0018267 A1 | 1/2008 | Arakawa et al. | |
| 2008/0018269 A1 | 1/2008 | Wyatt et al. | |

* cited by examiner

*Primary Examiner* — Robert Pezzuto
(74) *Attorney, Agent, or Firm* — Neal, Gerber & Eisenberg LLP

(57) ABSTRACT

A variable speed transaxle is disposed in a transaxle housing and drives a pair of axles extending horizontally from opposite sides of the housing. An external mounting surface is formed on the housing to mount a prime mover thereon. A power take-off assembly may be engaged to and driven by the prime mover output shaft and disposed at least partially in the transaxle housing. A power take-off shaft powered by the prime mover extends horizontally from the housing in a direction perpendicular to the axles. A pair of clutch assemblies using a plurality of gears may be engaged to the axle shafts to selectively engage and drive each axle shaft.

25 Claims, 22 Drawing Sheets

DRIVE ASSEMBLY

CROSS-REFERENCE

This application claims the benefit of U.S. Provisional Application No. 61/233,026 filed on Aug. 11, 2009 and U.S. Provisional Application No. 61/288,673 filed on Dec. 21, 2009, both of which are incorporated by reference in their entirety.

BACKGROUND OF THE INVENTION

This invention relates to a drive assembly incorporating a variable speed transmission for use in driving a vehicle or other apparatus, such as a walk-behind snow thrower or brush cutter.

SUMMARY OF THE INVENTION

An improved drive assembly is disclosed herein, as disclosed in more detail below, including a variable speed transmission and specifically a hydrostatic transaxle used to power both output axles and a power take-off ("PTO") assembly.

A better understanding of the objects, advantages, features, properties and relationships of the invention will be obtained from the following detailed description and accompanying drawings which set forth illustrative embodiments that are indicative of the various ways in which the principles of the invention may be employed.

DETAILED DESCRIPTION OF THE DRAWINGS

Figure 1:
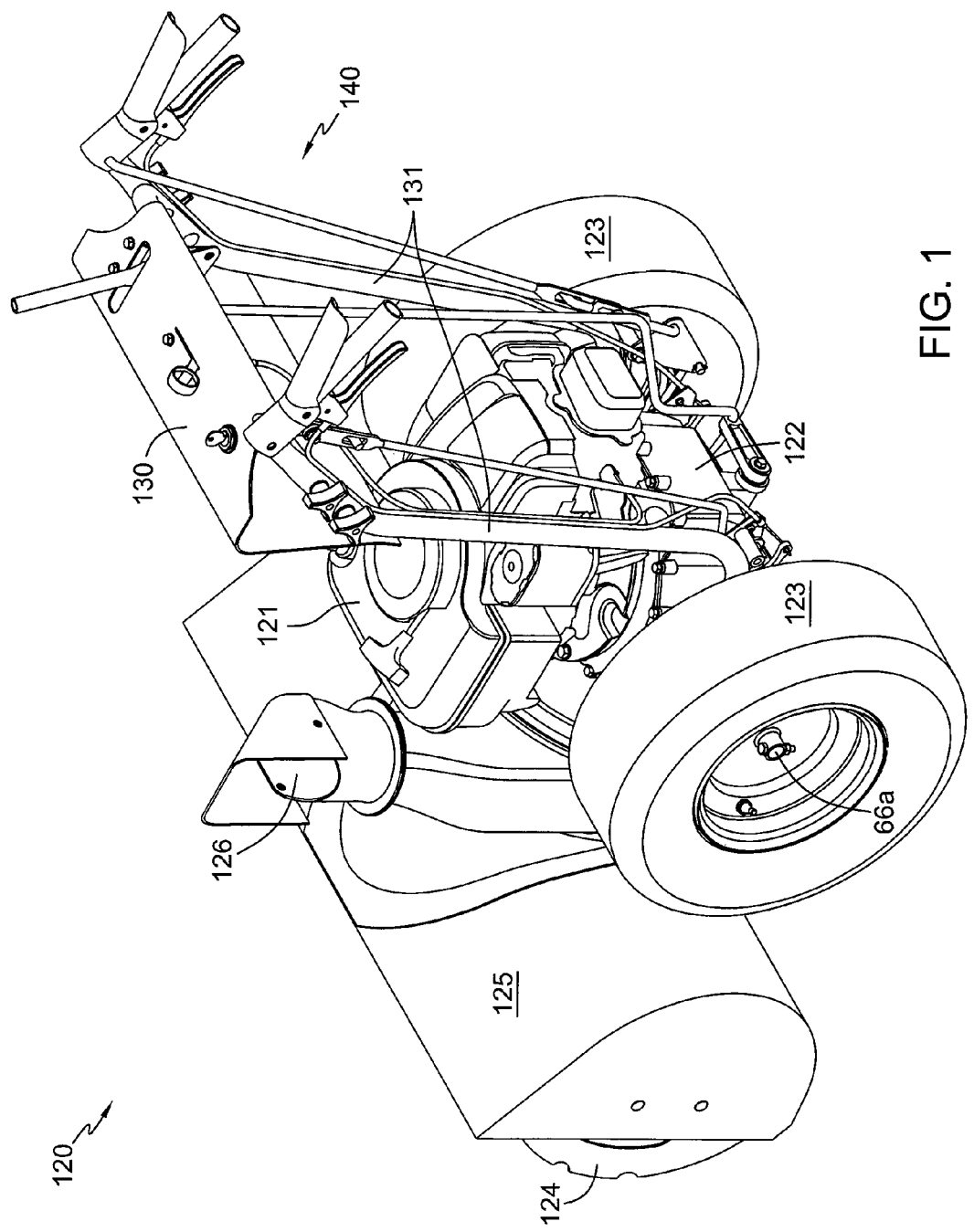
FIG. 1 is a perspective view of a snow thrower incorporating a first embodiment of a drive assembly in accordance with the present invention.
Figure 2:
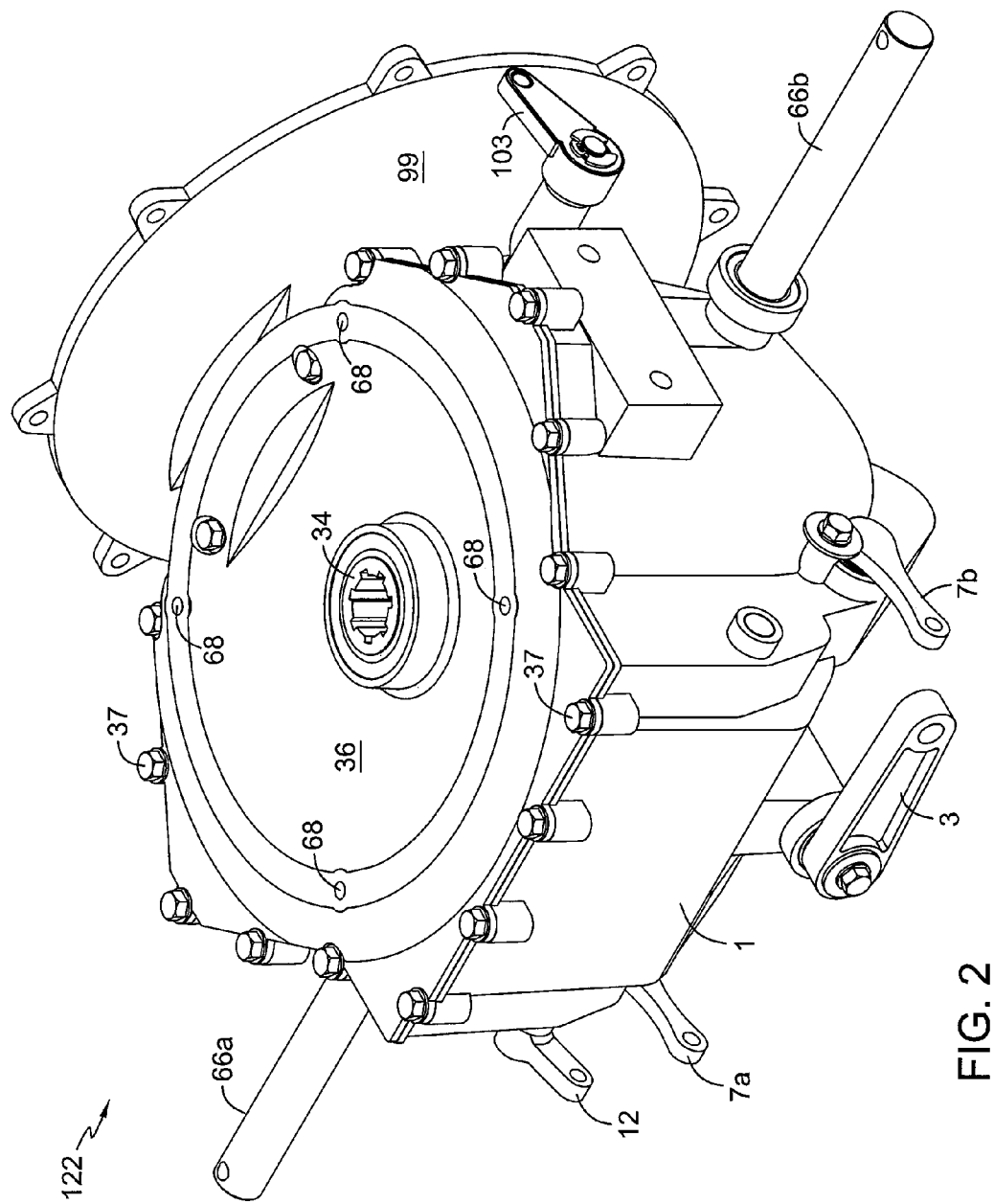
FIG. 2 is a top perspective view of the drive assembly of FIG. 1.
Figure 3:
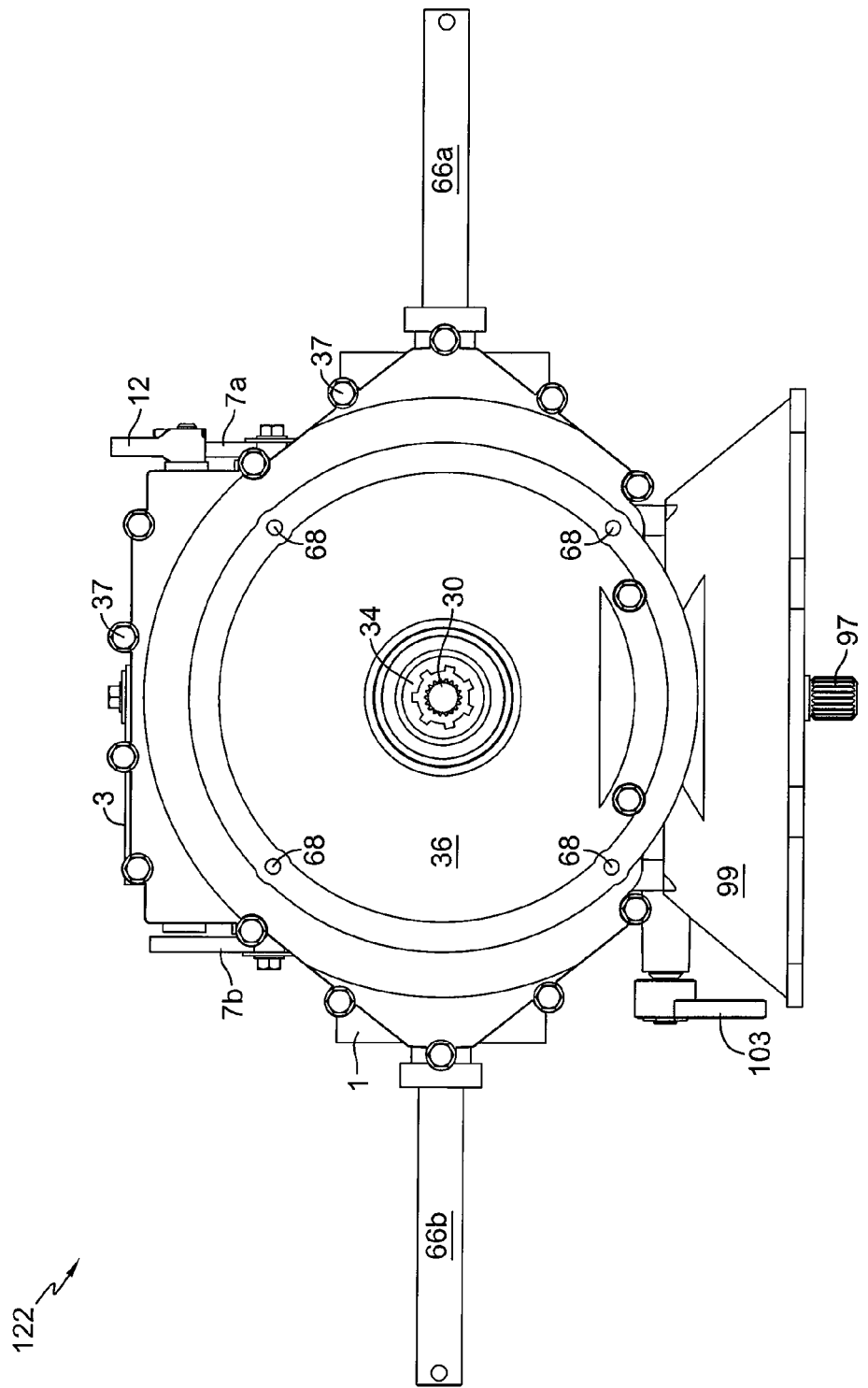
FIG. 3 is a top plan view of the drive assembly of FIG. 2.
Figure 4:
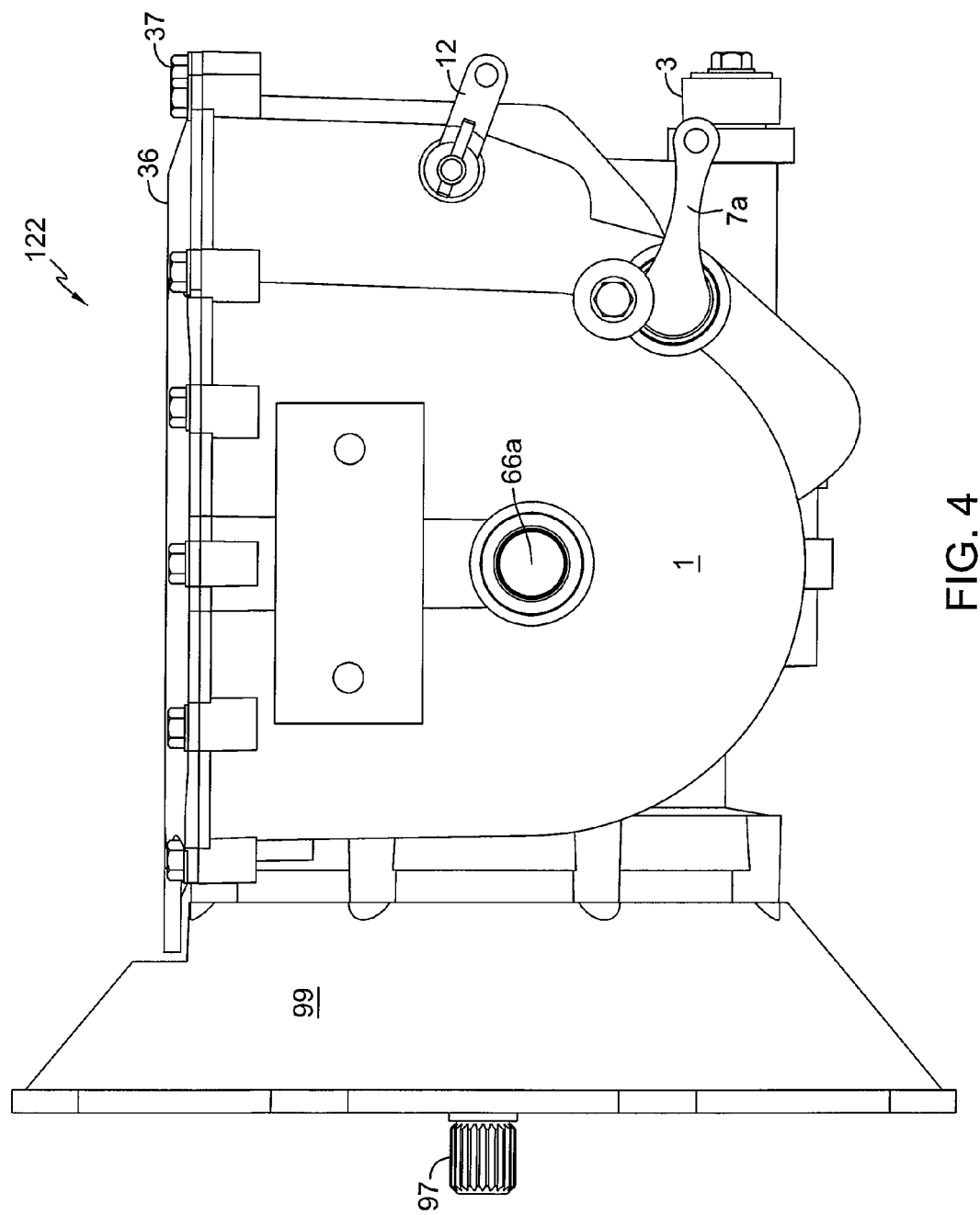
FIG. 4 is a side elevational view of the drive assembly of FIG. 2.
Figure 5:
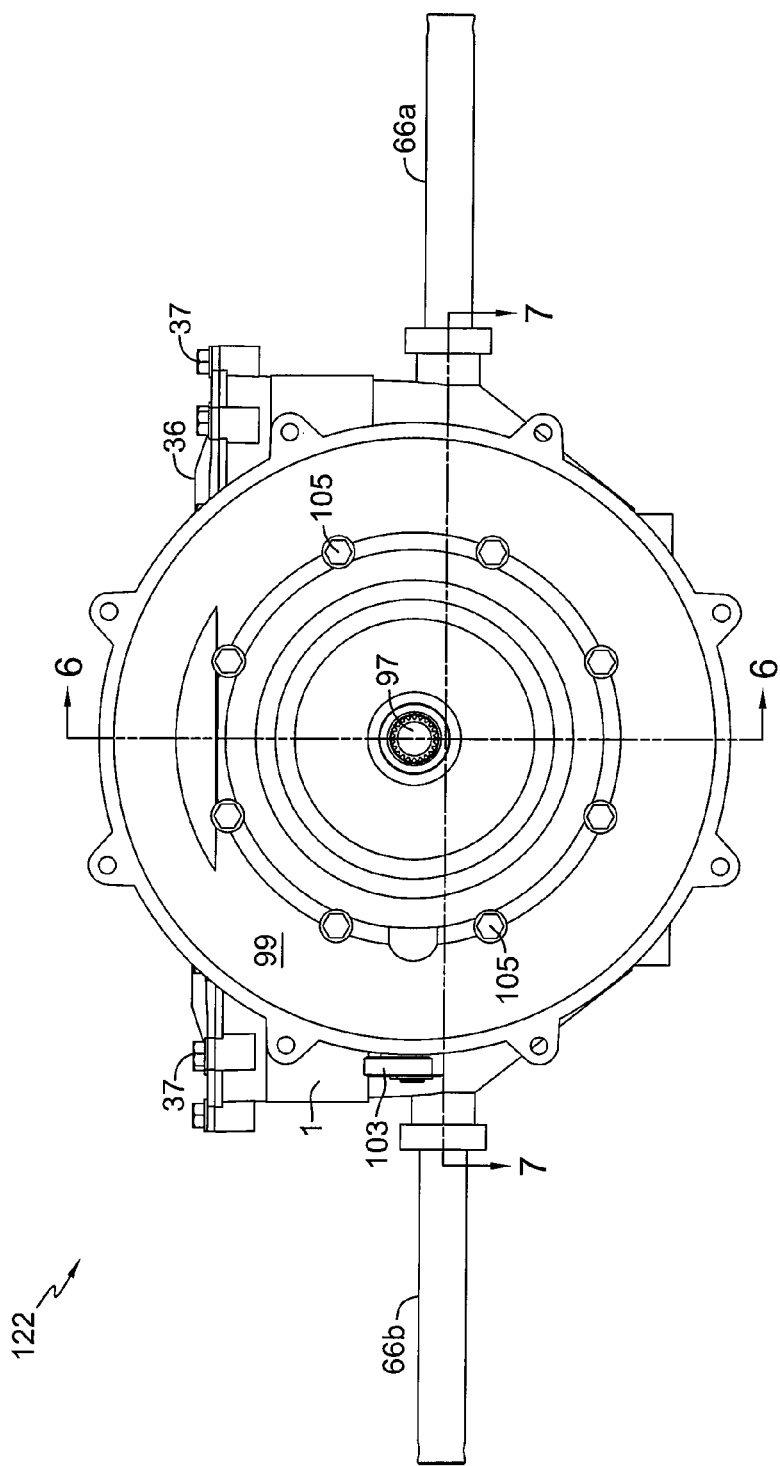
FIG. 5 is a front elevational view of the drive assembly of FIG. 2.

The description that follows describes, illustrates and exemplifies one or more embodiments of the present invention in accordance with its principles. This description is not provided to limit the invention to the embodiments described herein, but rather to explain and teach the principles of the invention in order to enable one of ordinary skill in the art to understand these principles and, with that understanding, be able to apply them to practice not only the embodiments described herein, but also other embodiments that may come to mind in accordance with these principles. The scope of the present invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Certain elements that are similar to other elements but used on different sides of the drive apparatus may be labeled using "a" and "b" in addition to the reference numeral where such labeling assists in understanding the disclosure. Such labeling and drawing practices do not necessarily implicate an underlying substantive purpose. As stated above, the present specification is intended to be taken as a whole and interpreted in accordance with the principles of the present invention as taught herein and understood by one of ordinary skill in the art. Furthermore, as used herein, the terms "vertical" and "horizontal" are applied with respect to the ground and may be approximate.

Vehicle 120, shown in FIG. 1 as a snow thrower, includes a prime mover 121 and a first embodiment variable speed transaxle 122 having an integral PTO assembly driving an auger 124 used to feed snow to a blower device including scoop 125 and discharge chute 126. Prime mover 121 could be an internal combustion engine, electric motor or the like. Variable speed transaxle 122 is shown herein as a hydrostatic transaxle incorporating an axial piston pump and axial piston motor. Hydrostatic transaxles of this type are described generally in, e.g., commonly-owned U.S. Pat. No. 5,314,387. A hydrostatic transaxle design used in a snow thrower is shown in commonly-owned U.S. Pat. No. 6,651,529. The terms of both of these patents are incorporated herein by reference.

Vehicle 120 includes wheels 123 driven by output axle shafts 66a, 66b. A control panel 130 mounted on operator handle(s) 131 is connected to various linkages 140 to control the output of transaxle 122 and vehicle 120 in general. A benefit of the drive assembly disclosed herein is that it eliminates the need for a separate frame for the vehicle, but instead uses the external housing of transaxle 122 to support the various elements, thereby providing a compact design. Although attachment of operator handle 131 to transaxle 122 is not visible in FIG. 1, handle 131 may be attached directly to the external housing of transaxle 122 in the same manner as is shown in second embodiment FIG. 15, which illustrates the attachment of handle 131 directly to the external housing of transaxle 222 via fasteners 132.

As shown in FIGS. 2-5, the external housing of transaxle 122 comprises a main housing 1 and a cover 36 fastened together along a split line parallel to axle shafts 66a, 66b by means of fasteners 37. A PTO cover 99 is also secured to main housing 1 along a split line perpendicular to PTO shaft 97 by means of fasteners 105. PTO shaft 97 is oriented perpendicular to axle shafts 66a, 66b. Prime mover 121 is secured directly to cover 36 by means of fasteners secured through a mounting flange of prime mover 121 to mounting holes 68 in cover 36. Other components of vehicle 120 can be similarly secured to main housing 1, cover 36, or PTO cover 99.

The inner workings and arrangement of transaxle 122 are seen in FIGS. 6-14. Motor and center section assembly 40 can be seen most clearly in FIGS. 19-22, while the center section assembly with motor components removed can be seen in FIGS. 23-26.

A vertical output drive component such as an output shaft (not shown) of prime mover 121 enters transaxle 122 through cover 36 and engages an input tube 34 which drives both pump shaft 30 and a first bevel gear 33. Input tube 34 is partially supported by cover 36 and partially supported by its engagement with pump shaft 30, which is supported by center section 26.

From its centralized location in transaxle 122, center section 26 either directly or indirectly supports at least one end of all motive power shafts of transaxle 122, including indirectly supported input tube 34 and directly supported pump shaft 30, motor shaft 46, PTO shaft 97, and axle shafts 66a, 66b. As shown in, e.g., FIGS. 7, 21 and 25, a pair of bearing openings 22a, 22b are provided on opposite sides of center section 26 so that the internal ends of axle shafts 66a, 66b are both rotatably supported within center section 26. Axle shafts 66a, 66b may be constrained as shown with spring pins 27 that are inserted into openings 26c in center section 26 to prevent or limit axial movement of axle shafts 66a, 66b.

As is known in the hydraulic arts, one or more housing elements may form an internal sump 55 that may provide fluid to lubricate various elements located in sump 55 and may provide the hydraulic fluid for the hydraulic pump, hydraulic motor, and other hydraulic elements of transaxle 122. Because the fluid in sump 55 can expand or contract with changes in temperature, it is usually desirable to provide a vent (not shown) for sump 55.

Figure 6:
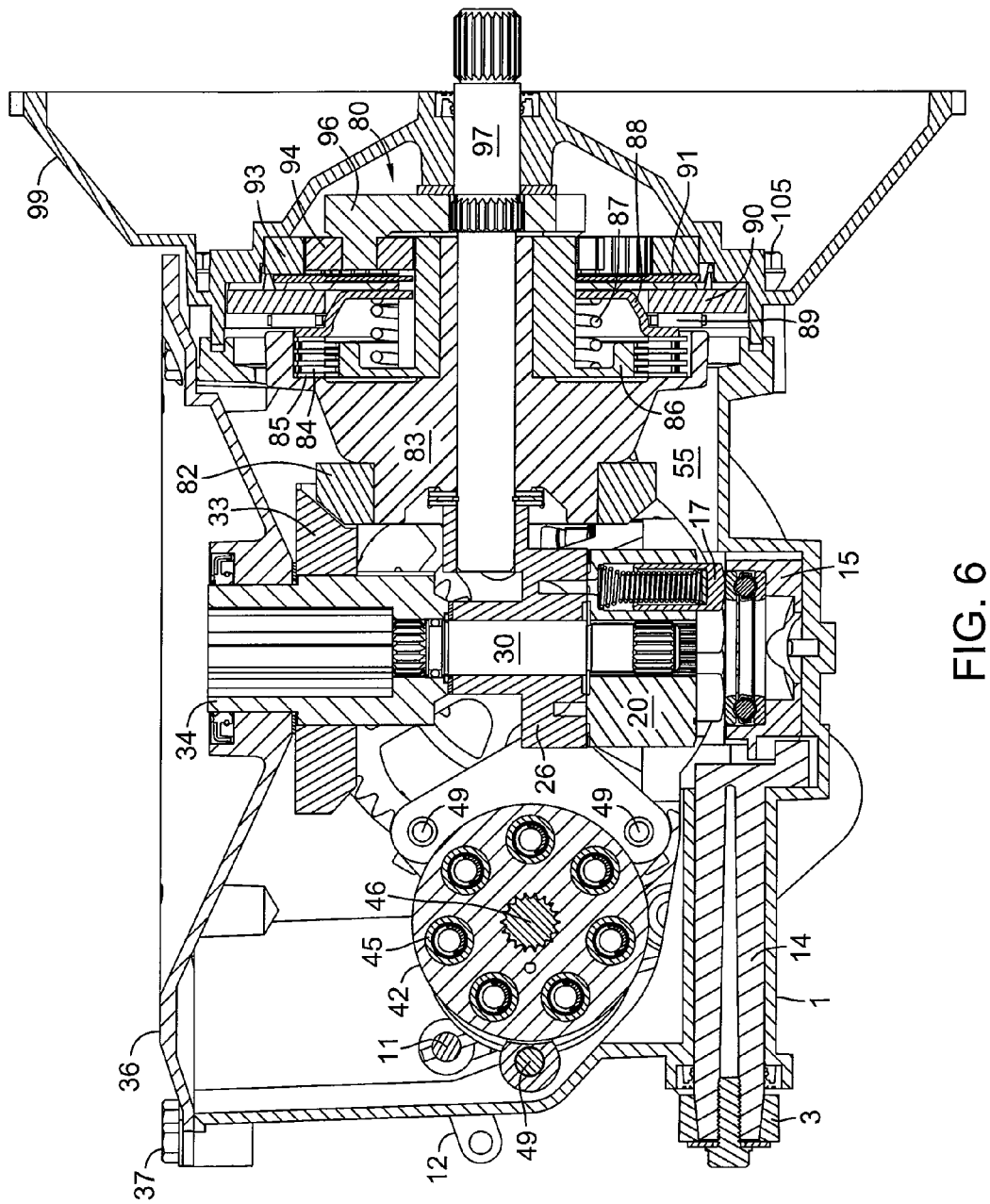
FIG. 6 is a cross-sectional view of the drive assembly of FIG. 2, along the line 6-6 in FIG. 5.
Figure 7:
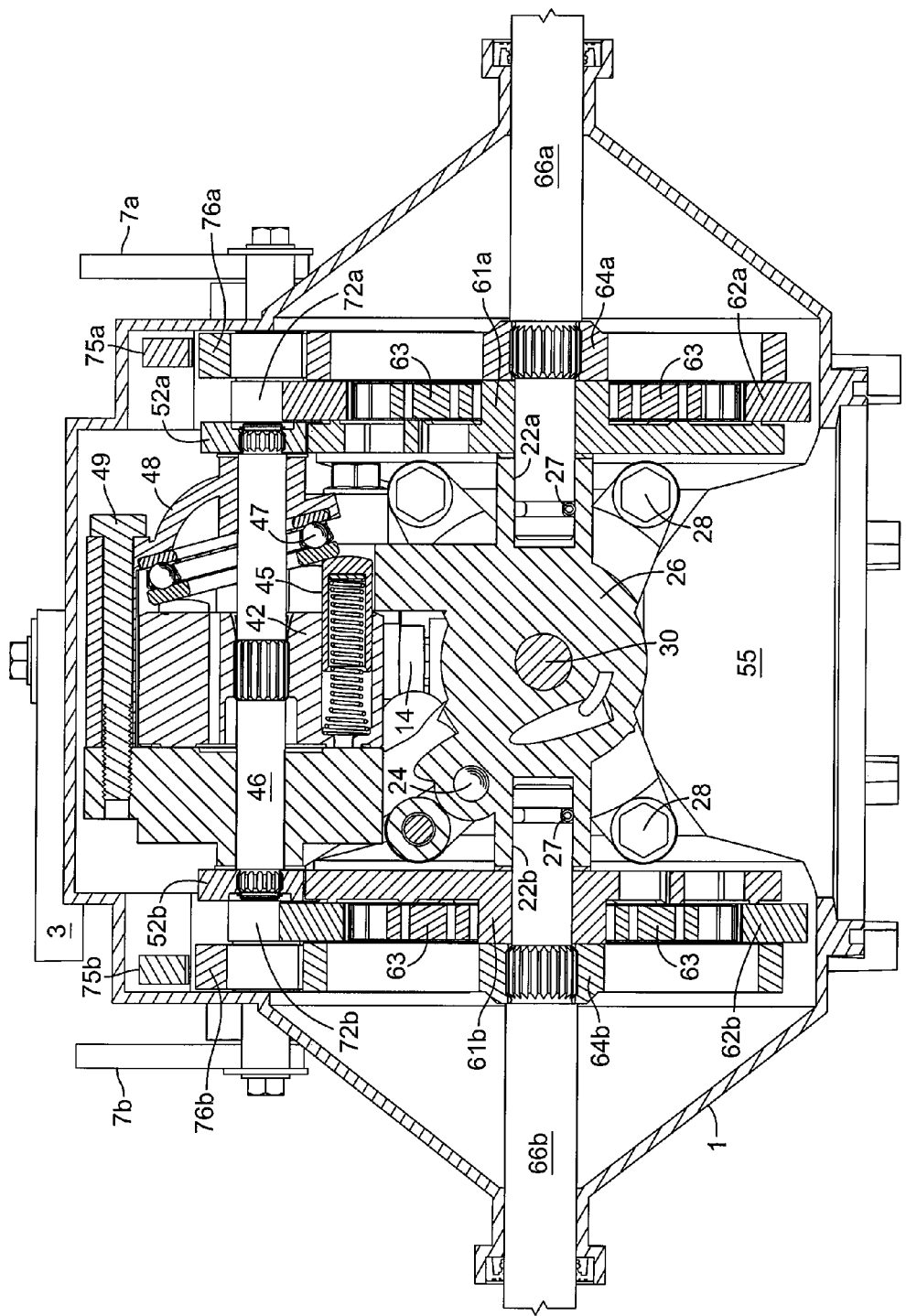
FIG. 7 is a cross-sectional view of the drive assembly of FIG. 2, along the line 7-7 in FIG. 5, with the PTO components and PTO cover removed.
Figure 8:
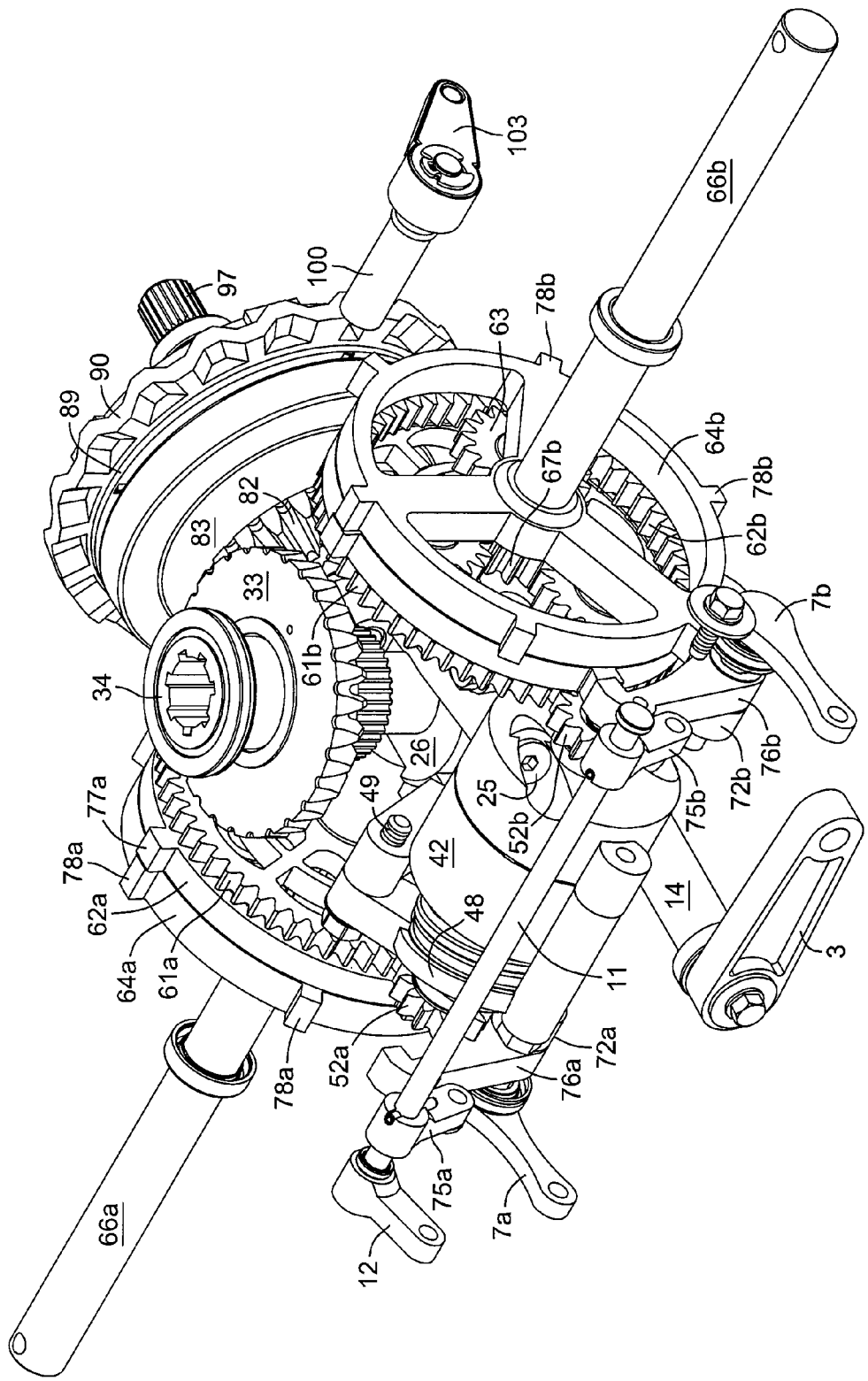
FIG. 8 is a top perspective view of the drive assembly of FIG. 2, similar to FIG. 2, but with the external housings removed.
Figure 9:
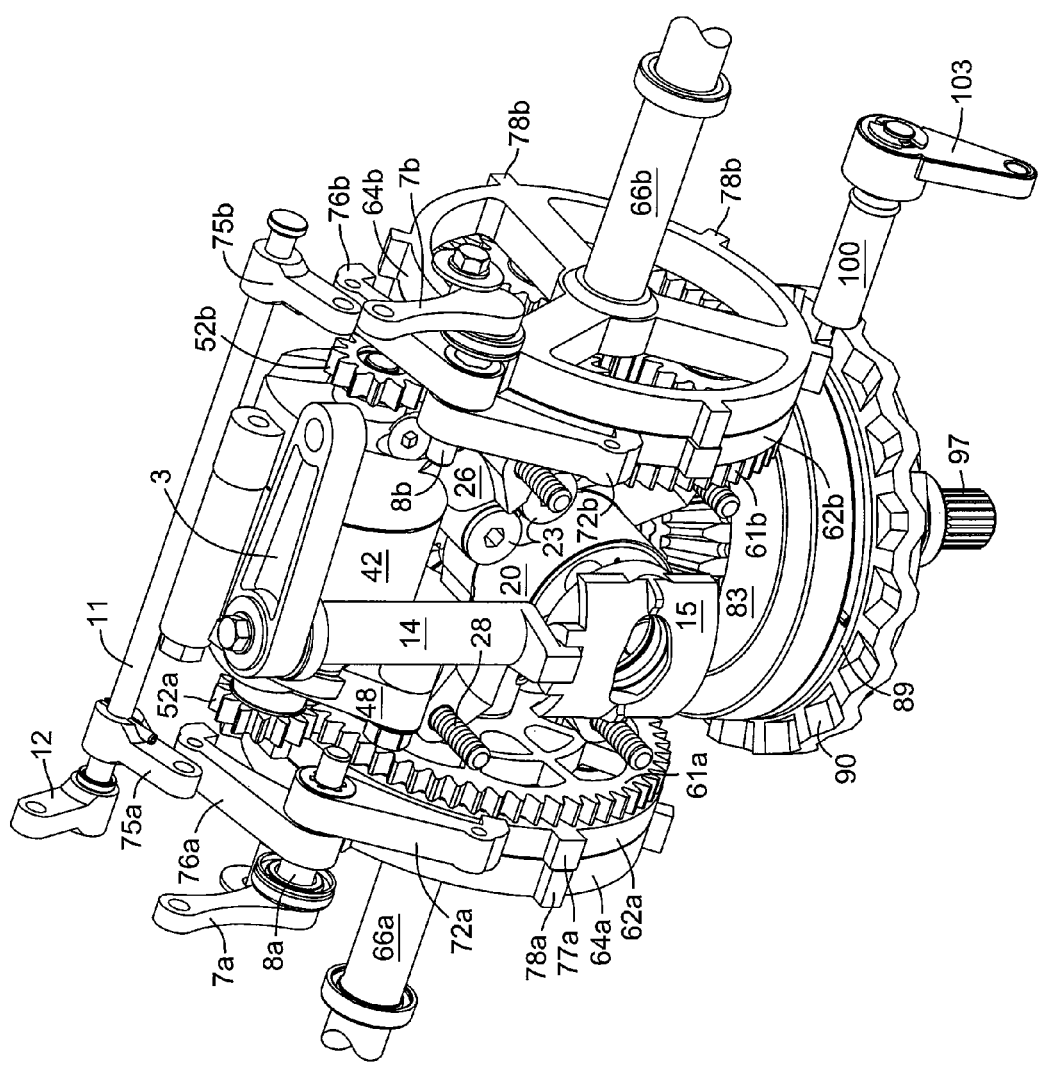
FIG. 9 is a bottom perspective view of the drive assembly of FIG. 2, with the external housings removed.
Figure 10:
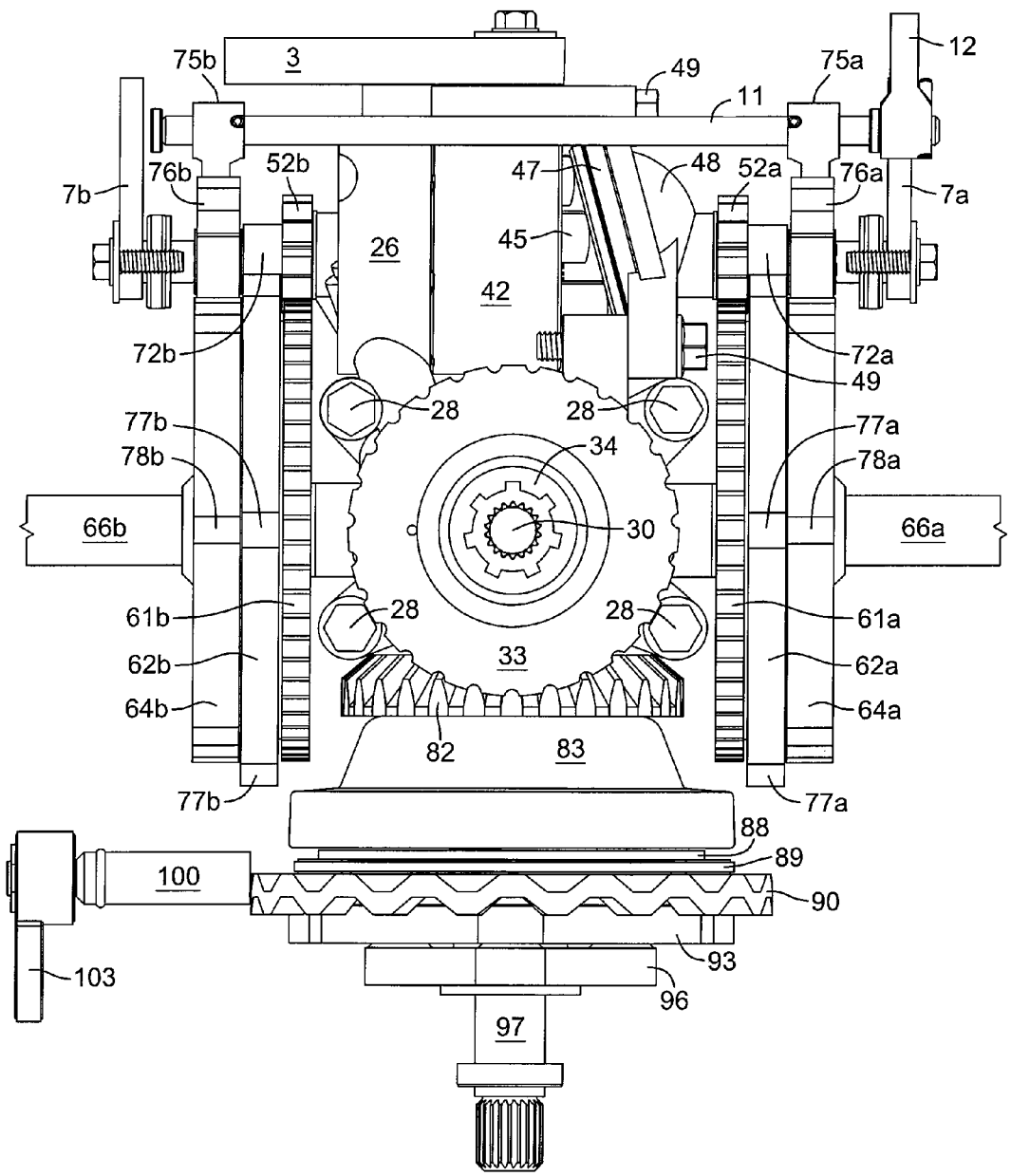
FIG. 10 is a top plan view of the drive assembly of FIG. 2, similar to FIG. 3, but with the external housings removed.
Figure 11:
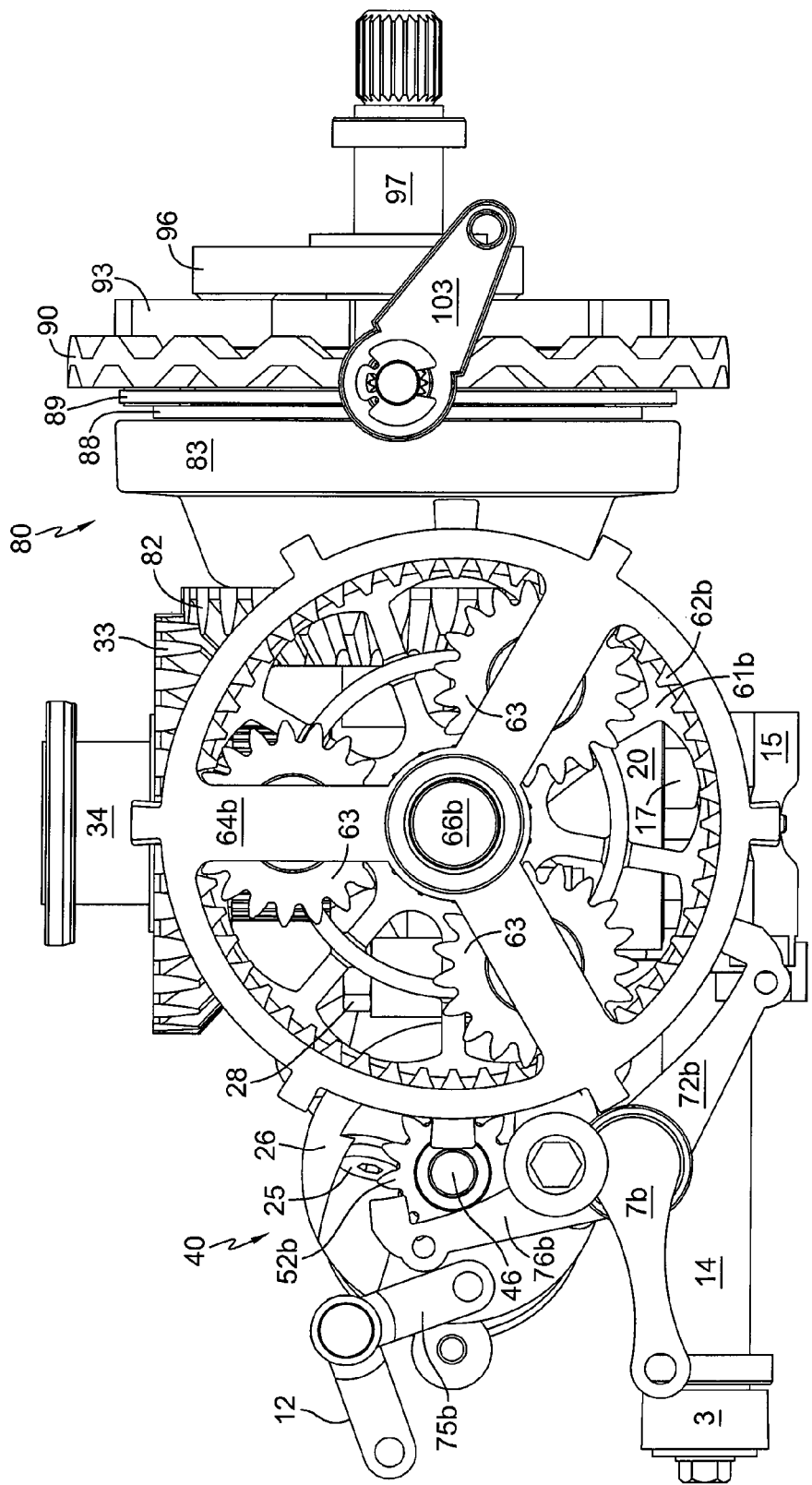
FIG. 11 is a side elevational view of the drive assembly of FIG. 2, similar to FIG. 4, but from the opposite side and with the external housings removed.
Figure 12:
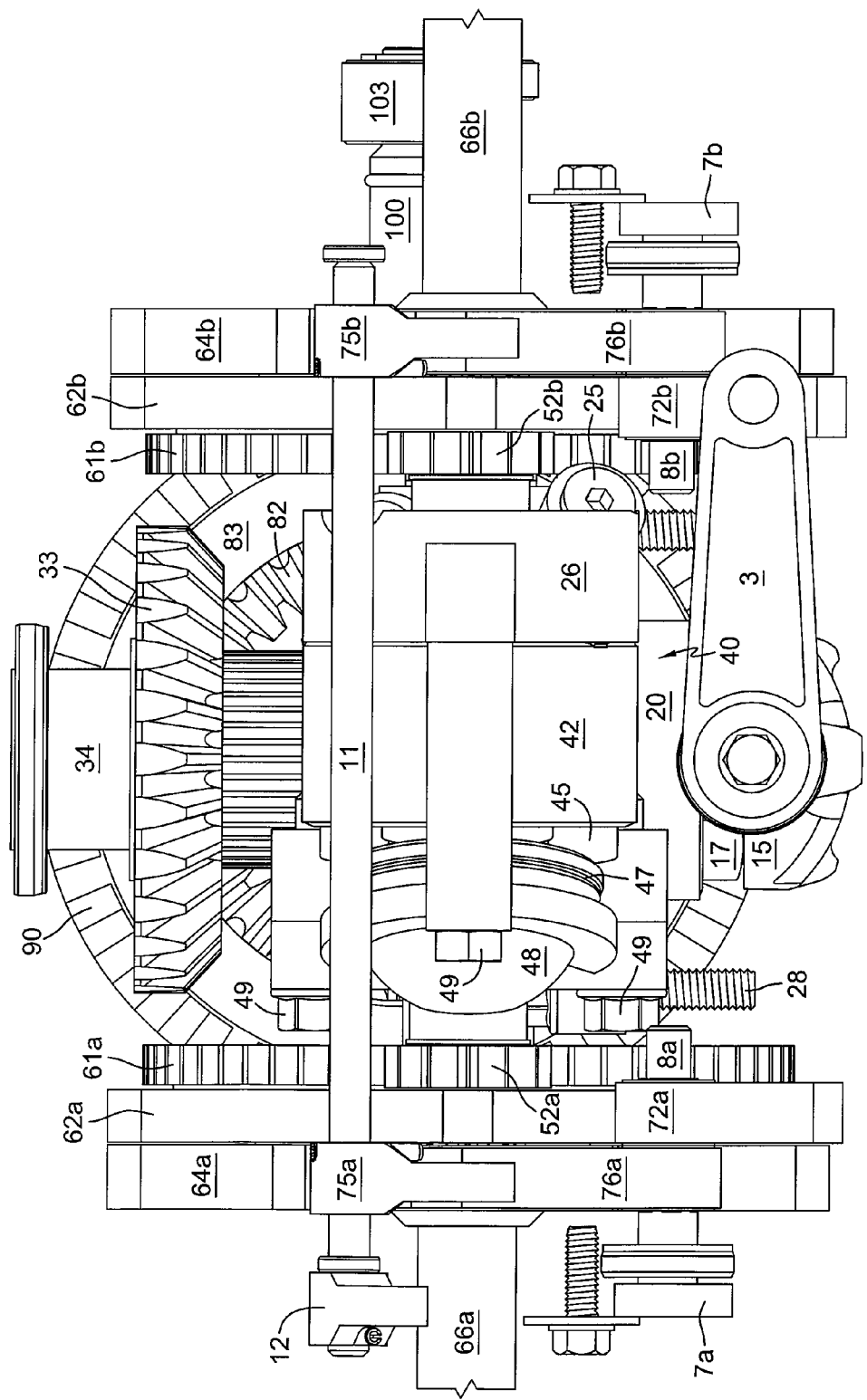
FIG. 12 is a rear elevational view of the drive assembly of FIG. 2 with the external housings removed.

Pump shaft 30 extends through center section 26 to engage and drive pump cylinder block 20, as shown in cross-section in, e.g., FIG. 6. Pump cylinder block 20 is rotatably disposed on a running surface 26a (which can be seen in, e.g., FIGS. 20 and 22) of center section 26. The output of pump cylinder block 20 and its axial pistons 17 is controlled by the rotational and arcuate movement of trunnion arm 14 and swash plate 15, respectively. Trunnion arm 14 extends outside main housing 1 to be controlled by the previously mentioned linkages 140 through control arm 3, which is engaged to and rotates with trunnion arm 14. It will be understood that a running surface can also incorporate a valve plate disposed between the cylinder block and the center section.

Motor cylinder block 42 is rotatably disposed on a running surface 26b of center section 26 and is hydraulically connected to pump cylinder block 20 through hydraulic porting and fluid passages formed internal to center section 26. Check plugs or seats 23 and associated check balls 24 are disposed in center section 26 to permit fluid exchange between sump 55 and the internal fluid passages. Additional fluid passage ports 29 may be formed during casting of center section 26; in the depicted embodiment, ports 29 are closed by means of passage plugs 25. With some minor modification to center section 26, shock valves or the like may be substituted for passage plugs 25 if deemed necessary or desirable for a particular working application of transaxle 122.

Motor cylinder block 42 uses axial pistons 45 and drives motor shaft 46 with pistons 45 engaging a thrust bearing 47 that is supported by thrust bearing support 48. Bearing support 48 is attached to center section 26 via fasteners 49. Although 3-point mounting is illustrated, the number of fasteners 49 and attachment points used to secure bearing support 48 to center section 26 can be modified as needed to ensure function and durability of assembly 40. Motor shaft 46 extends through motor cylinder block 42, center section 26, and bearing support 48, and has pinion gears 52a, 52b disposed on either end thereof so that the single motor shaft 46 powers both output axles independently and without need of a differential, in order to provide zero turn capability in a compact design. As can be seen in, e.g., FIGS. 7 and 21, motor shaft 46, pinion gears 52a and 52b, thrust bearing 47 and motor cylinder block 42 with its associated components such as pistons 45, for example, are all supported by the fastener-joined combination of center section 26 and bearing support 48 in a compact arrangement which also facilitates ease of assembly and servicing. Motor and center section assembly 40 is attached to main housing 1 by fasteners 28.

A planetary gear arrangement is used to provide the proper reduction from motor shaft 46 to the ultimate output of axle shaft 66b. More specifically, pinion gear 52b is engaged to and drives a combination spur gear 61b, which includes a gear form 67b acting as a sun gear for the planetary gear drive. Planet carrier 64b includes a plurality of pins with a planet gear 63 disposed on each of the pins. Each planet gear 63 runs on the internal gear surface of ring gear 62b. It will be understood that the gearing for axle shaft 66a is preferably identical.

This drive apparatus incorporates a unique clutch dog driving system which permits independent control of the output of the two axle shafts 66a, 66b to provide zero turn capability to the unit, as shown most clearly in FIGS. 7-13. A "dead man" or operator presence mechanism is also provided and will be described in detail below.

Each axle shaft 66a, 66b is splined or otherwise fixed directly to and driven by its respective planet carrier 64a, 64b. In the figures, the different sides are labeled using "a" and "b" to indicate the different sides of the unit, but for clarity these suffixes will not be used in the following description of the clutch dog mechanism except if necessary to point out differences in the two sides or to otherwise facilitate understanding.

Each clutch system comprises a shaft 8 having a handle 7 secured thereto; in the depicted embodiment the shaft 8 and handle 7 are integrally formed as a single unit. Each handle 7a, 7b is engaged via portions of linkages 140 to a separate operator control, thereby permitting the user to alternately rotate the two shafts 8a, 8b in different directions or the same direction to provide independent control of the left and right sides of the vehicle. Each handle 7 is retained by a washer which is retained by a fastener engaged to main housing 1, as shown, e.g., in FIG. 2. This method of retaining handle 7 allows a simple design and installation while permitting handle 7 to rotate as allowed by the range of motion of linkages 140 and/or by stop features (not shown) formed on main housing 1 and/or handle 7.

On each side of the unit, outer dog 76 and inner dog 72 are mounted on shaft 8 and rotate together. In general terms, outer dog 76 is capable of engaging and preventing rotation of planet carrier 64 by engaging one of a plurality of stops 78 formed on an outer surface of planet carrier 64 and acting as an engagement mechanism to thereby provide a braking force to axle 66, and inner dog 72 is capable of engaging and preventing rotation of ring gear 62 by engaging one of a plurality of stops 77 formed on an outer surface of ring gear 62 and acting as an engagement mechanism to thereby provide drive force to axle 66. The operation of this clutch apparatus, which permits the user to independently control the two wheels, is shown in, e.g., FIGS. 8 and 9, which both show inner dogs 72 in the engaged, or drive position, as will be described below.

When shaft 8 is rotated in a first direction so that inner dog 72 engages ring gear 62, ring gear 62 is precluded from rotating. The rotational force of planet gears 63 on the inner gear form of ring gear 62 therefore causes planet carrier 64 to rotate, thus driving axle 66. When shaft 8 is rotated in the opposite direction, inner dog 72 will disengage from ring gear 62. When shaft 8 rotates to a position where inner dog 72 is disengaged from ring gear 62 and outer dog 76 is not yet engaged to planet carrier 64, axle 66 will be considered to be in a neutral position.

As shaft 8 continues its rotation in this opposite direction, outer dog 76 will eventually engage planet carrier 64, thereby precluding planet carrier 64 from rotating so that the rotational force of the motor output as transmitted through planet gears 63 simply causes ring gear 62 to rotate. Thus, in this position, axle 66 does not rotate and that side of the unit is in the stopped or braked position. It can be seen that the user can alternatively place one side in drive and the other in a braked or neutral position in order to achieve zero turn capability. Each side may be biased toward the position in which inner dog 72 is engaged to ring gear 62 by means of a spring (not shown).

The operator presence function is provided by a brake cam control arm 12 engaged to a rotatable brake cam mounting shaft 11 and a pair of brake engagement cams 75 pinned or otherwise secured to rotatable shaft 11. Brake cam control arm 12 is engaged to an external linkage as part of linkages 140. Each cam 75 engages one of the outer dogs 76 and may be biased by means of a spring (not shown) to the engaged position in a manner so as to force outer dog 76 into engagement with planet carrier 64 to prevent rotation of axles 66. When brake cam control arm 12 is engaged by the operator, it overcomes this bias force to disengage cams 75 from the two outer dogs 76. Since this is a "dead man" type switch, both cams 75 are in the same engaged or disengaged position at the same time. Only when brake cam control arm 12 is so engaged by the user can the clutch steering shafts 8 be rotated to either the drive, braked or neutral positions as described above. Furthermore, due to the geometry of the unit, the bias force on brake cam control arm 12 will be greater than the bias force on the separate shafts 8a and 8b on which dogs 72 and 76 are disposed, so that the unit will generally be biased to a position where the outer dogs 76 are in the engaged position and both sides of the unit are stopped.

Turning to the PTO assembly 80, as shown in, e.g., FIG. 6, the vertical output of prime mover 121 also powers the PTO shaft 97 to power auger 124. Portions of PTO assembly 80 are housed in PTO cover 99 which is secured to main housing 1. A first bevel gear 33 receives rotational force from input tube 34 and drives a second bevel gear 82 which also has an internal gear form engaged to and driving clutch cage 83.

PTO assembly 80 also includes a planetary gear set and more particularly ring gear 93 and a plurality of planet gears 94 mounted on pins on planet carrier 96, with PTO shaft 97 splined or otherwise fixed to and driven by planet carrier 96. As seen in, e.g., FIGS. 6 and 14, a plurality of clutch plates 84 and friction clutch plates 85 are sandwiched together and captured in cage 83 to transmit rotational force from cage 83 to sun gear 86 when the clutch is actuated.

Figure 13:
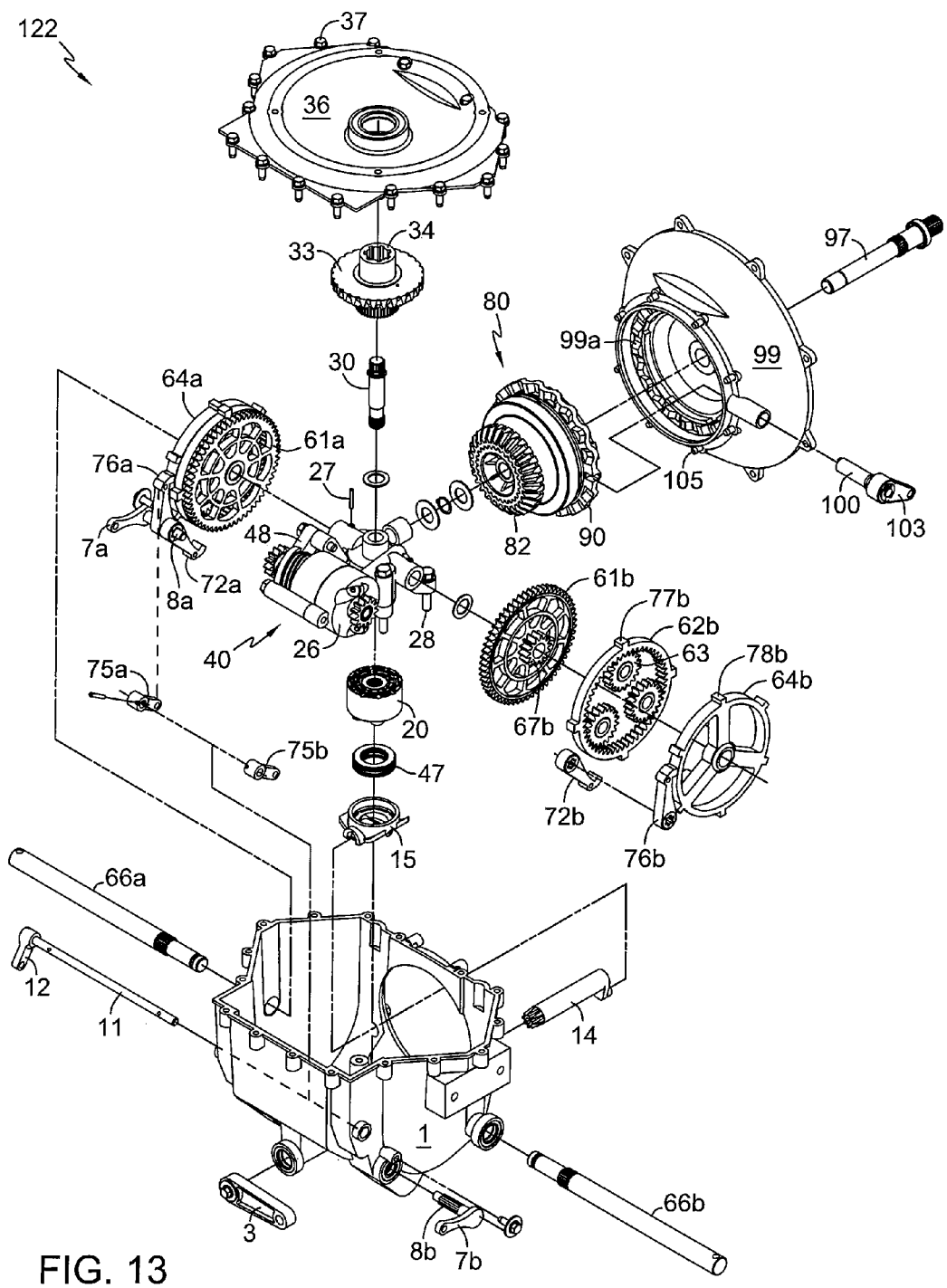
FIG. 13 is an exploded perspective view of certain components and component groupings of the hydrostatic and drive portions of the drive assembly of FIG. 2.
Figure 14:
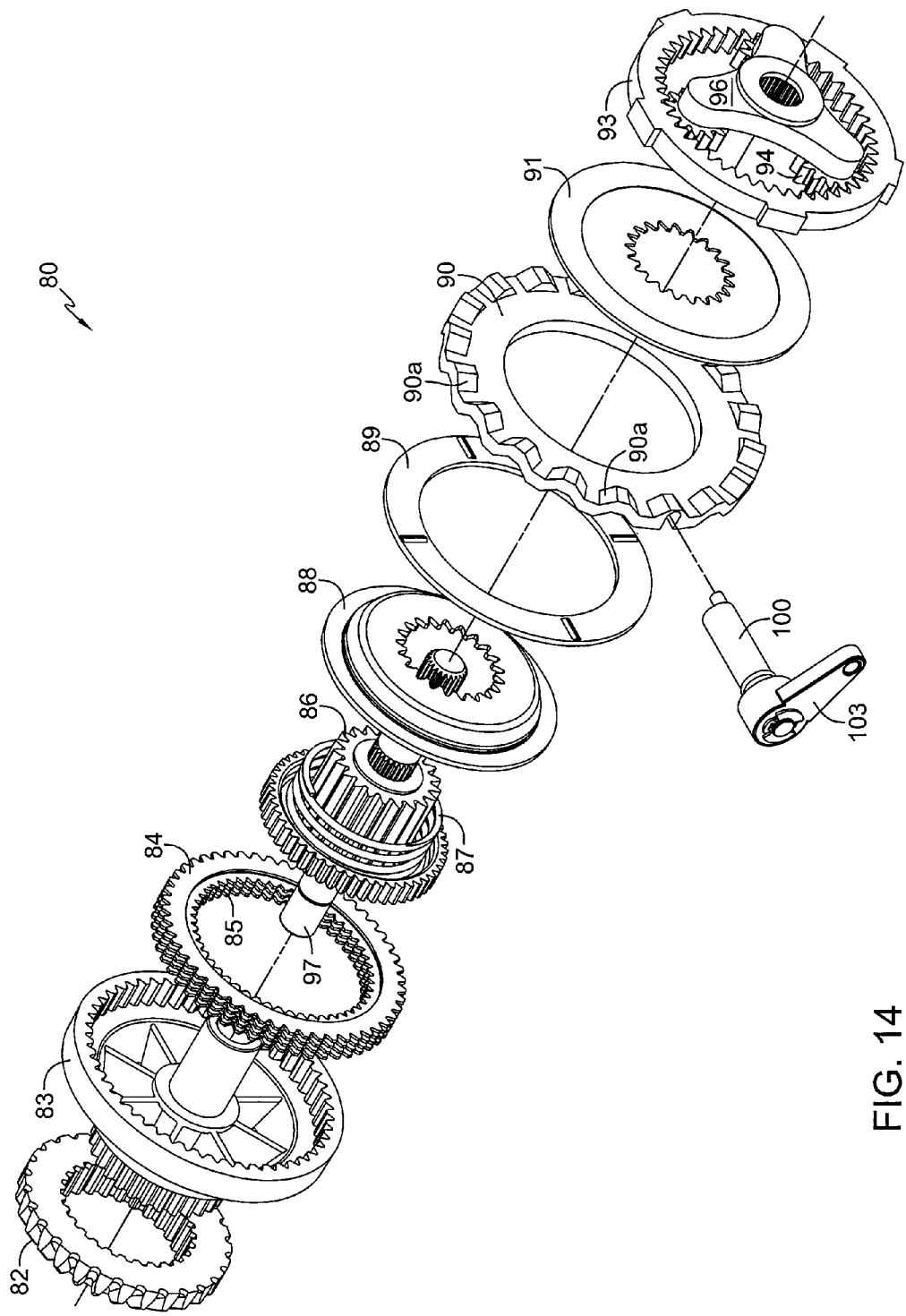
FIG. 14 is an exploded perspective view of certain components of the PTO assembly of the drive assembly of FIG. 2.

The clutch is externally actuated by cam shaft 100 engaged to and actuated by handle 103, which can be attached to the linkages 140 previously discussed. Rotation of activation plate 90 to an activated position moves activation plate 90 and thrust bearing 89 axially toward cage 83, transmitting force through thrust washer 88, compressing clutch plates 84 and 85, which are captured in cage 83. This compression and the resulting frictional engagement of clutch plates 84 and 85 permits the axial rotation of cage 83 to be transmitted through to sun gear 86, which is mounted on and rotates freely with respect to PTO shaft 97. The previously mentioned axial movement of activation plate 90 is accomplished by the interface of a plurality of ramps 90a formed on activation plate 90 with similar mating ramps 99a formed on PTO cover 99, as shown in FIG. 13.

The PTO clutch assembly also includes a brake plate 91 slidably mounted on sun gear 86 and engaging ring gear 93 to provide a braking force thereto. Brake plate 91 is biased into the engaged position by spring 87 acting through thrust washer 88. Thus, the aforementioned axial movement of thrust bearing 89 and thrust washer 88 also acts to compress spring 87, removing the spring force from brake plate 91.

Figure 15:
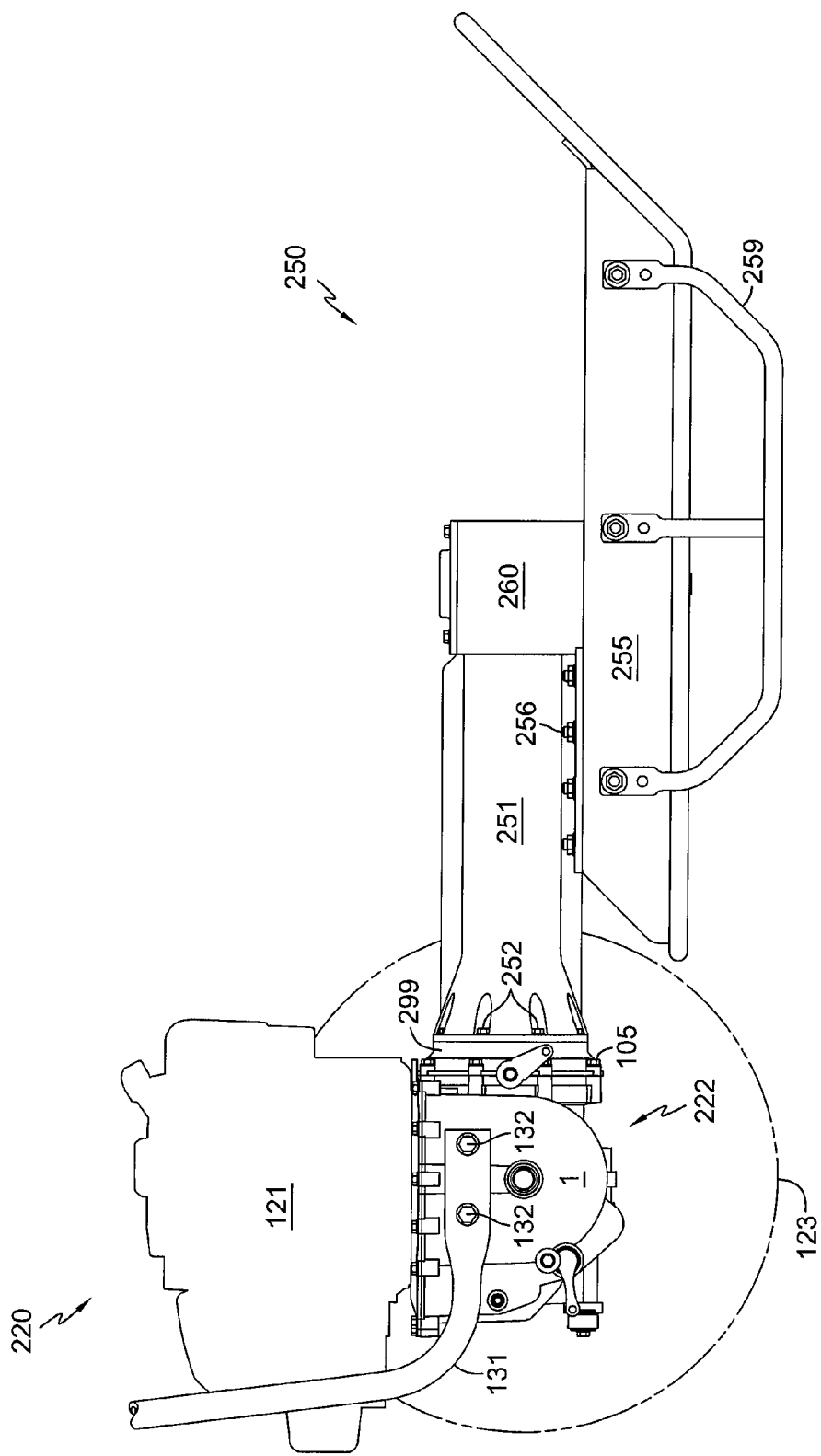
FIG. 15 is a side elevational view of a brush cutter incorporating a second embodiment of a drive assembly in accordance with the present invention.
Figure 16:
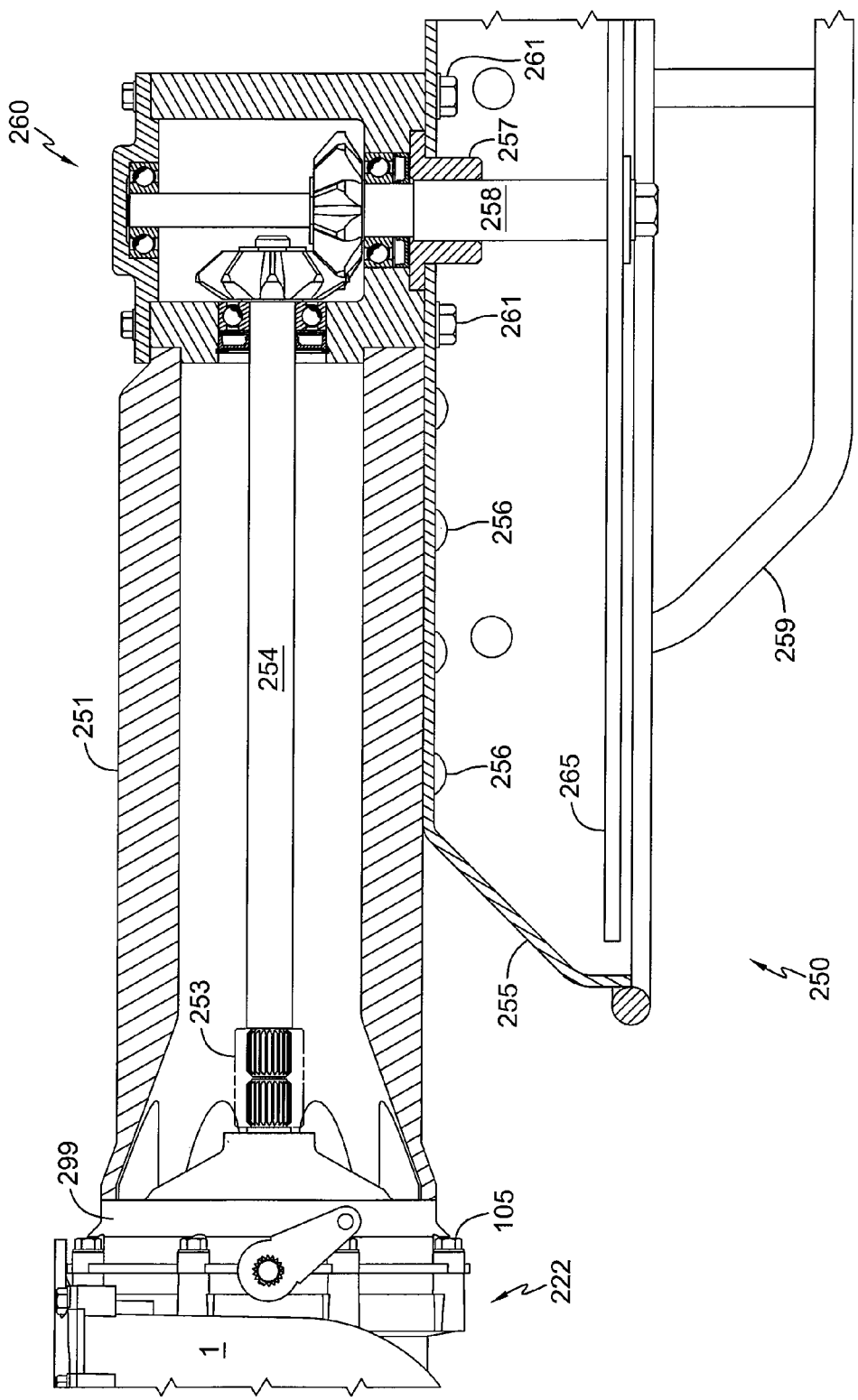
FIG. 16 is a portion of the side elevational view of FIG. 15 partially cut away to reveal certain details of the brush cutter deck drive.
Figure 17:
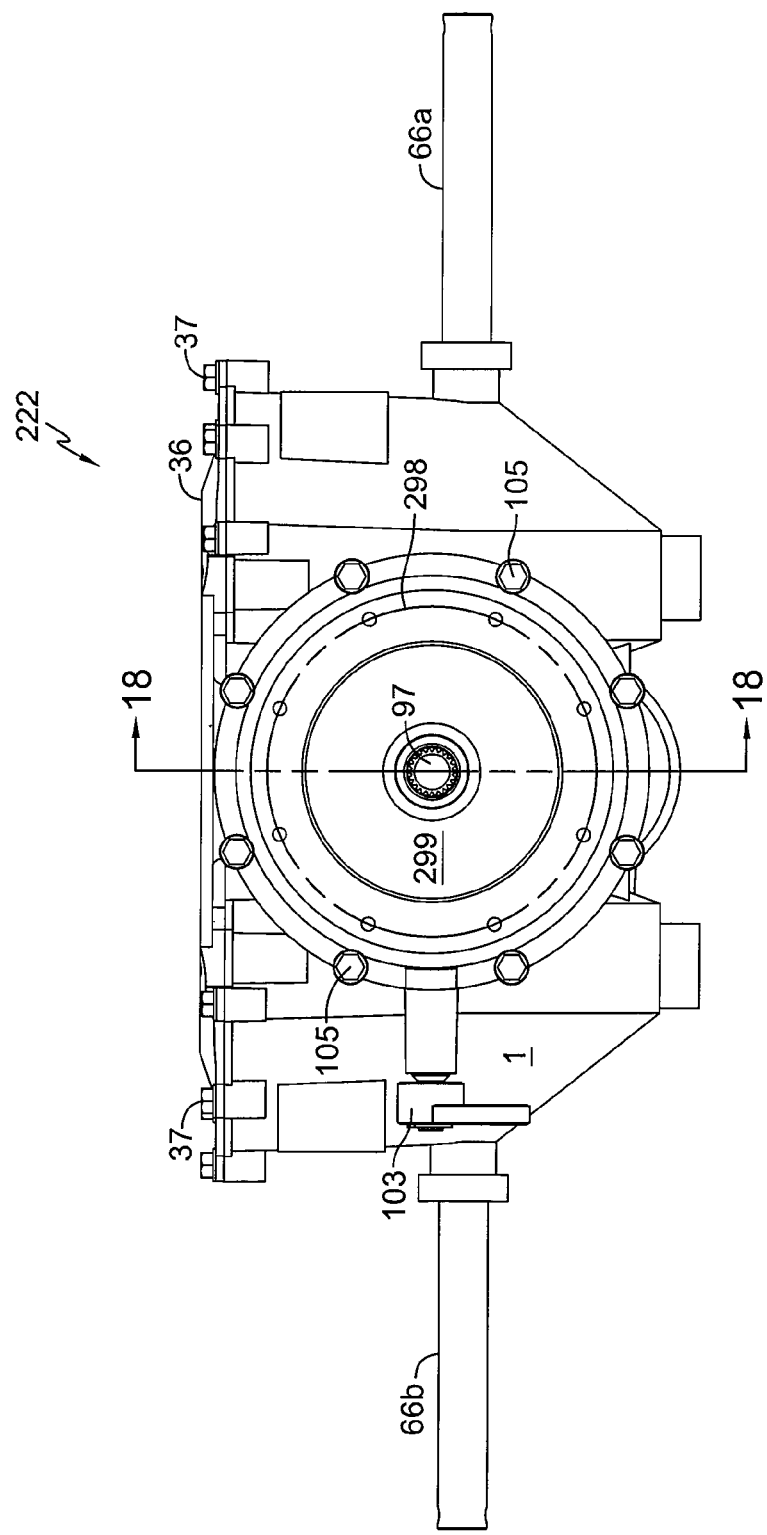
FIG. 17 is a front elevational view of the drive assembly of FIG. 15.
Figure 18:
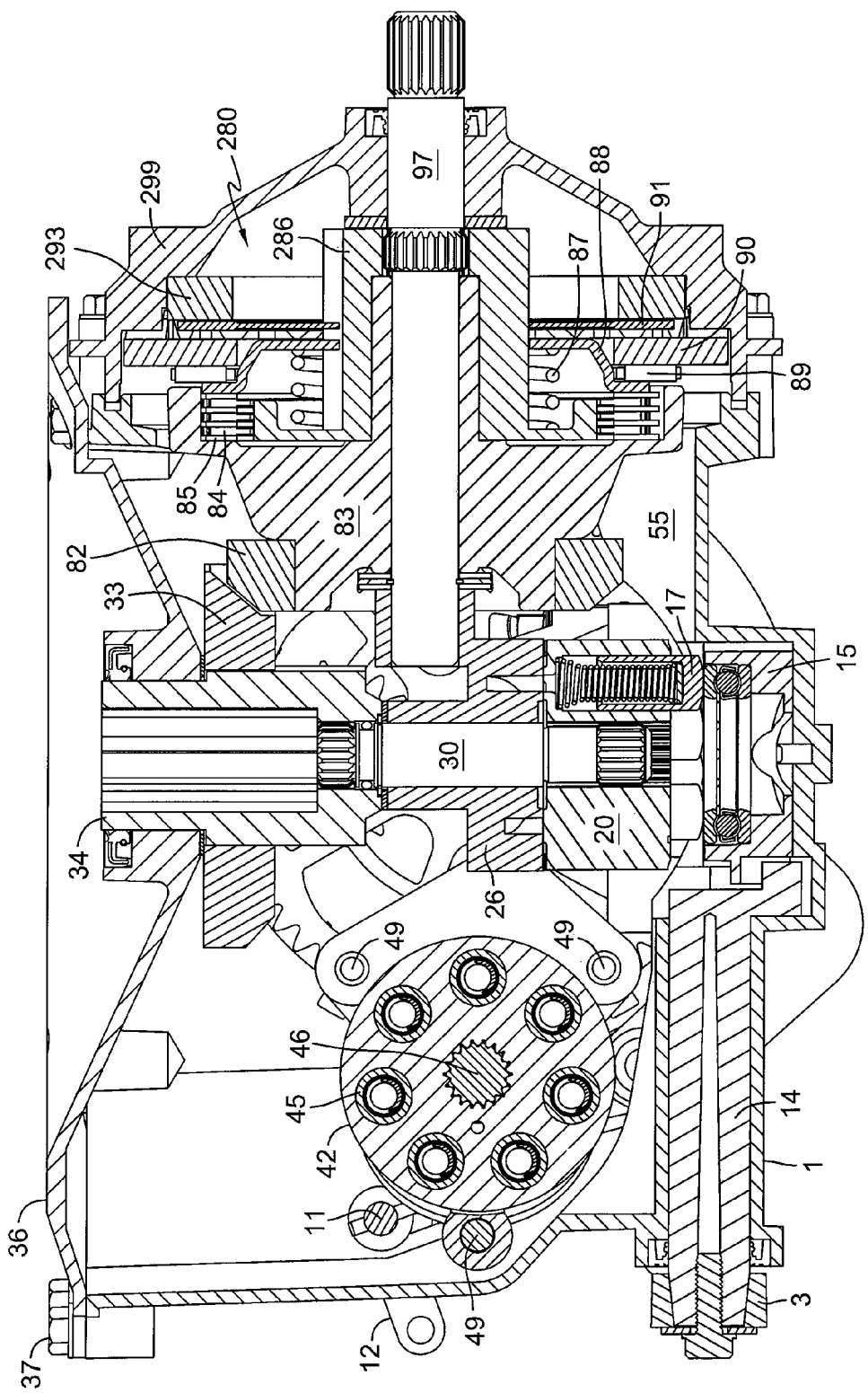
FIG. 18 is a cross-sectional view of the drive assembly of FIG. 15 along the line 18-18 in FIG. 17.
Figure 20:
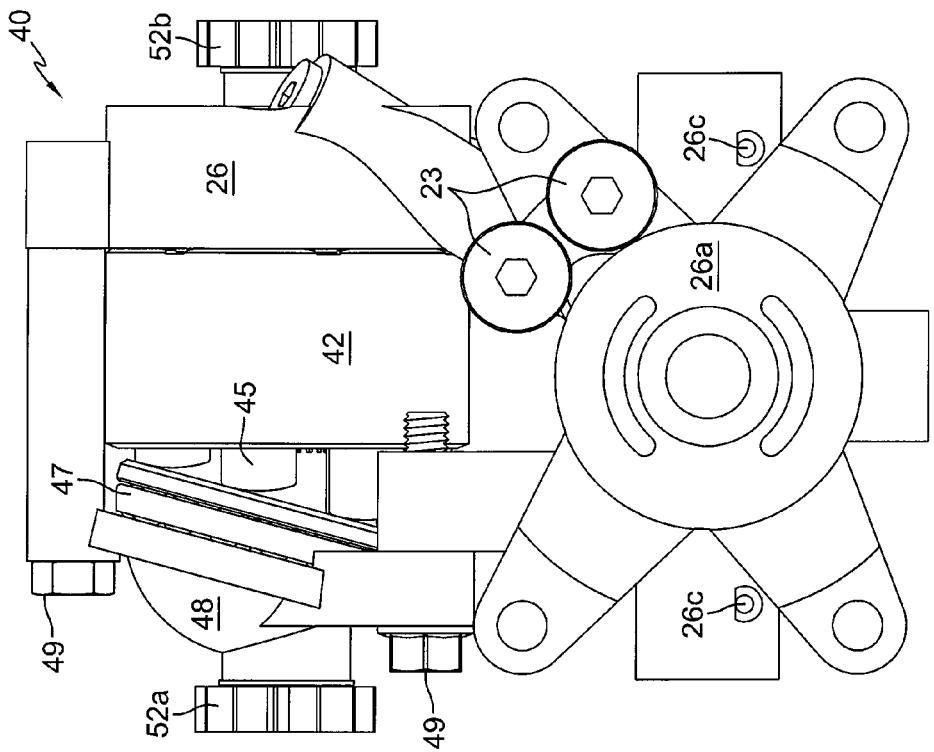
FIG. 20 is a bottom plan view of the center section and motor assembly of FIG. 19.
Figure 19:
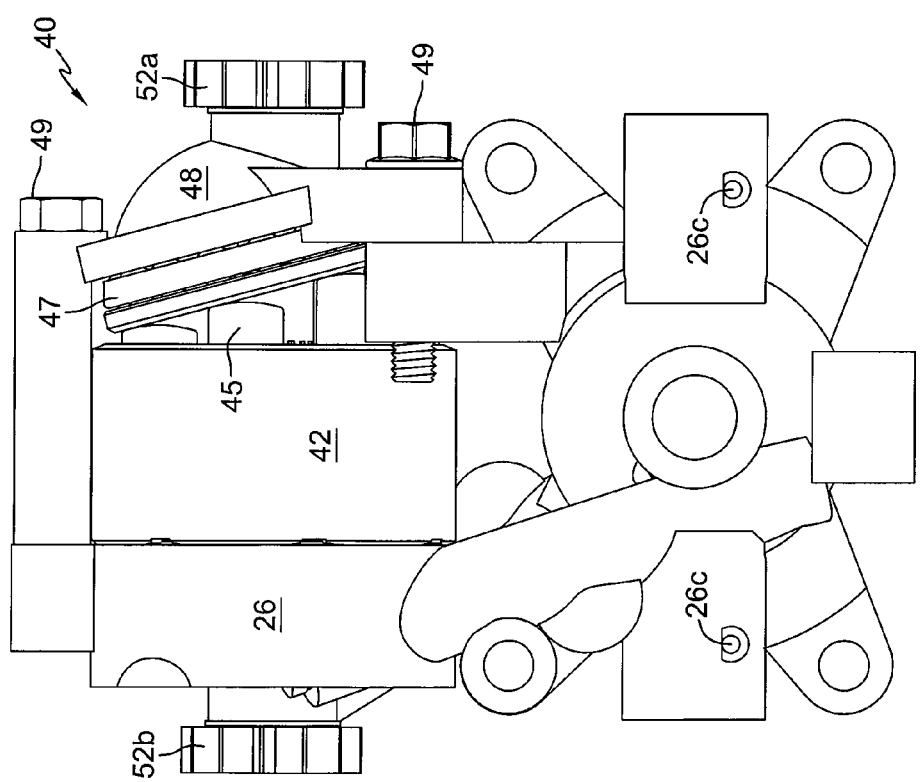
FIG. 19 is a top plan view of an exemplary center section and motor assembly for use in the drive assemblies disclosed herein.
Figure 21:
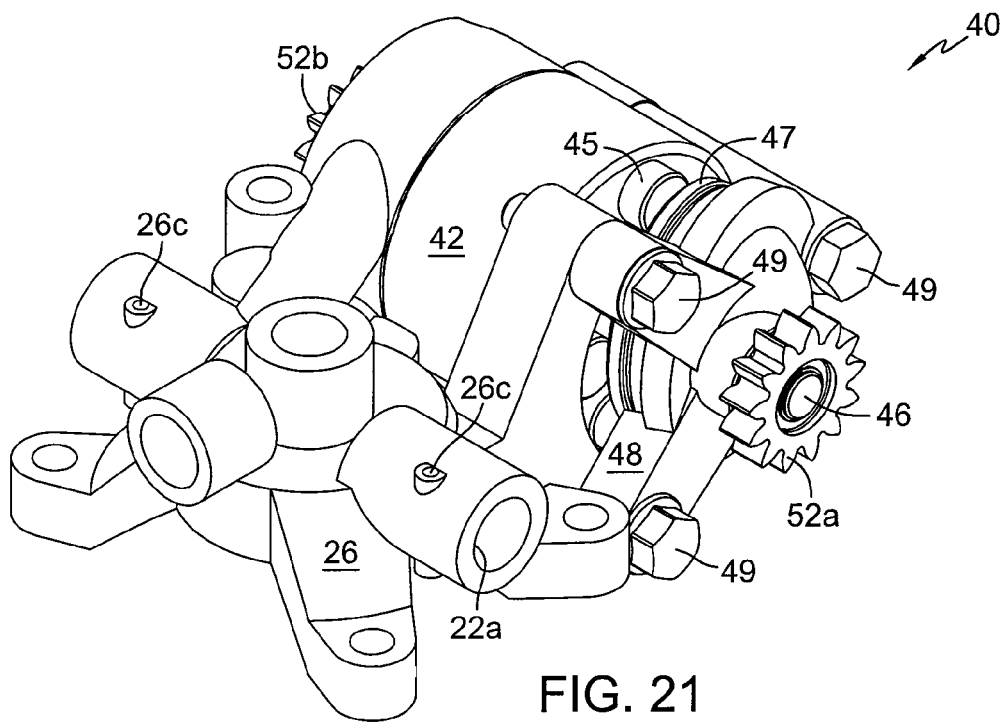
FIG. 21 is a top perspective view of the center section and motor assembly of FIG. 19.
Figure 22:
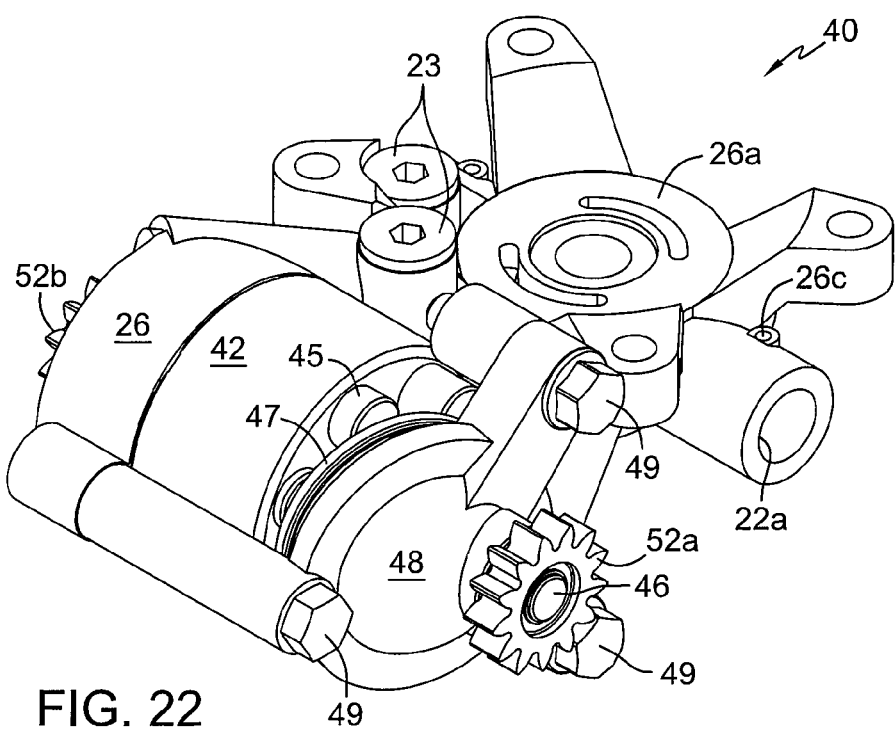
FIG. 22 is a bottom perspective view of the center section and motor assembly of FIG. 19.
Figure 23:
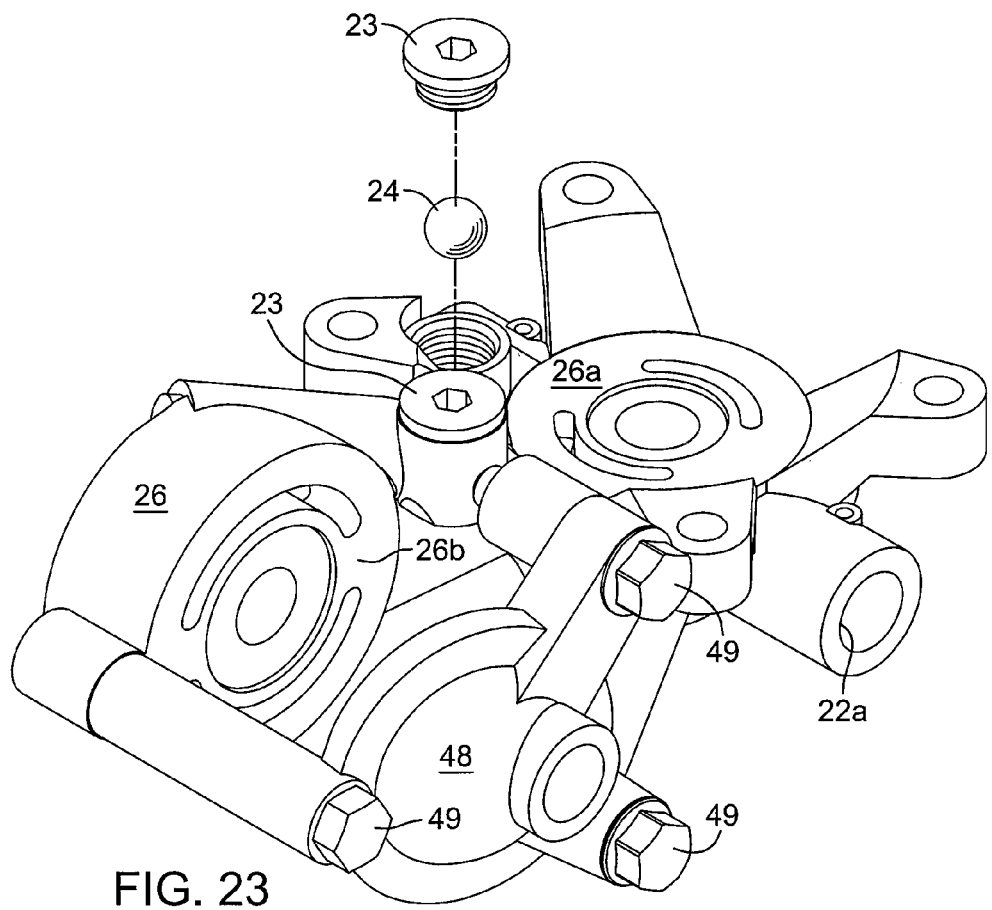
FIG. 23 is a partially exploded bottom perspective view of the center section and motor assembly of FIG. 19 with the motor components removed.
Figure 24:
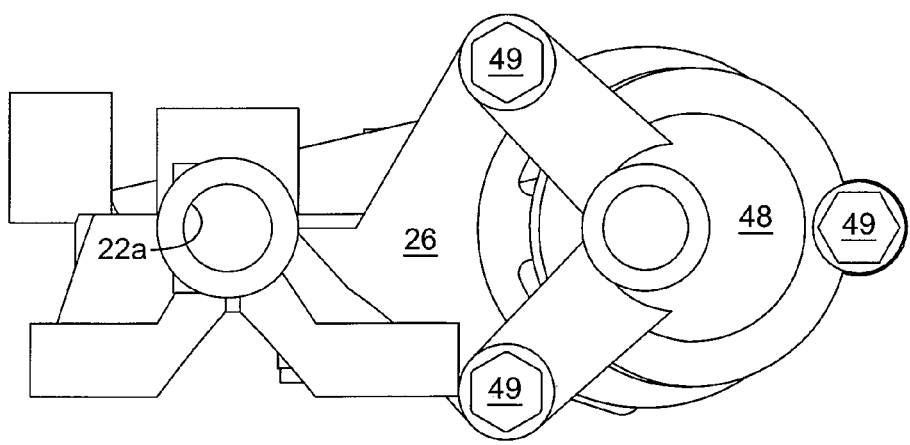
FIG. 24 is a side elevational view of the center section and motor assembly of FIG. 19 with the motor components removed.
Figure 25:
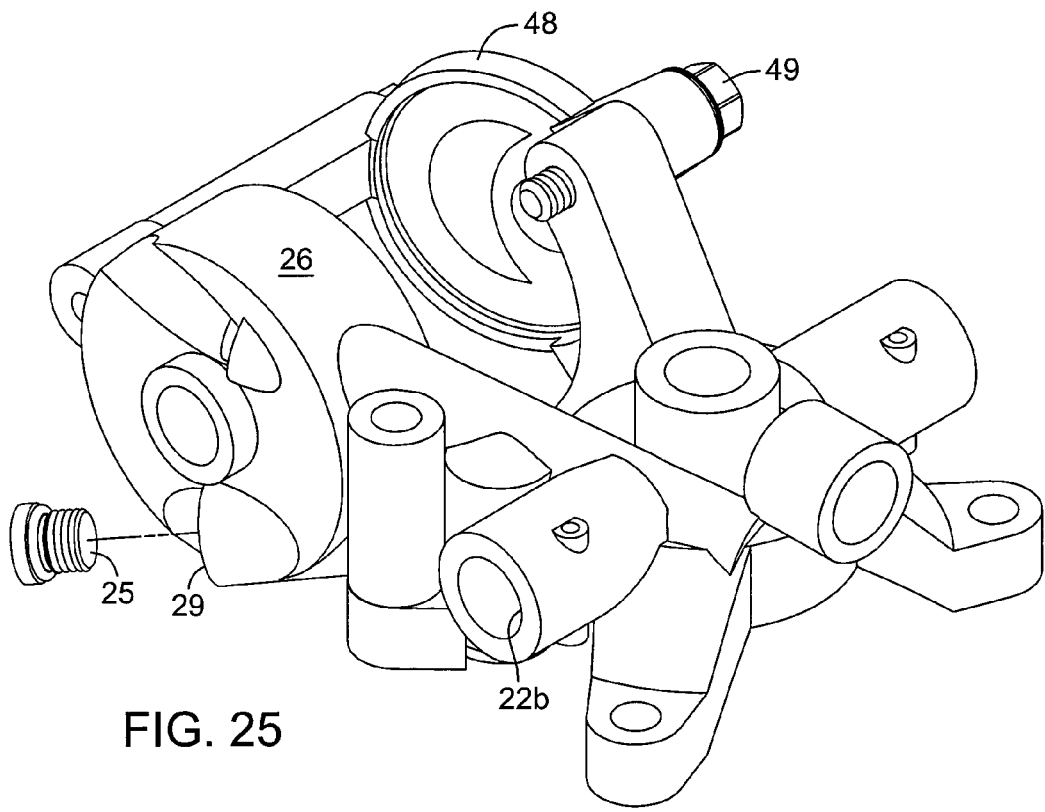
FIG. 25 is a partially exploded top perspective view of the center section and motor assembly of FIG. 19 with the motor components removed.
Figure 26:
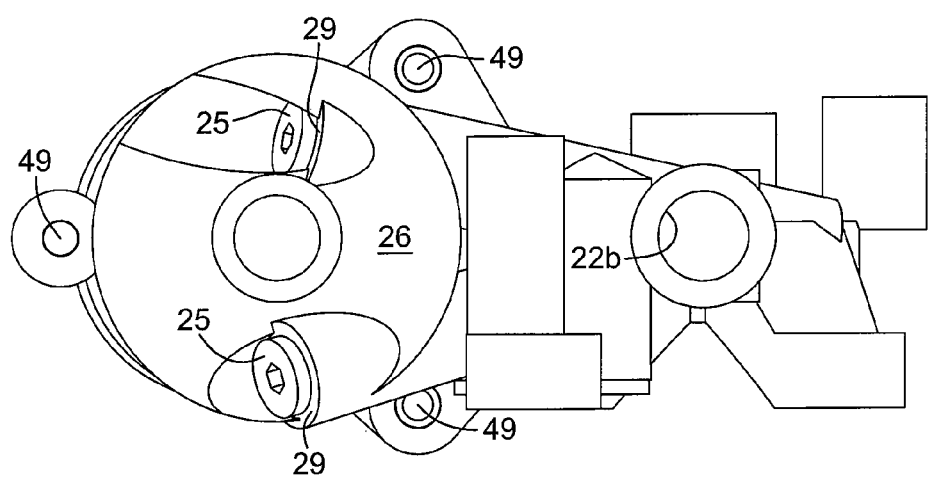
FIG. 26 is a side elevational view of the center section and motor assembly of FIG. 19 with the motor components removed, similar to FIG. 24, but from the opposite side.

A transaxle assembly 222 and brush cutter vehicle 220 in accordance with a second embodiment of this invention are illustrated in FIGS. 15-18. FIG. 15 depicts portions of a brush cutter vehicle 220 which may be controlled in basically the same manner as vehicle 120 shown in FIG. 1. The control panel 130 and linkages 140 shown in FIG. 1 have been omitted in FIG. 15 and just one of two wheels 123 is shown in phantom so that the frameless aspect of vehicles or mobile equipment enabled by the transaxle embodiments described herein can be illustrated more clearly. The second embodiment transaxle 222, like transaxle 122, is a variable speed transaxle with integrated PTO assembly 280. As shown in FIGS. 16-18, however, PTO assembly 280 does not include the PTO planetary reduction gears. Sun gear 86 of PTO assembly 80 has been replaced with brake disc carrier 286, which is splined or otherwise fixed to and drives PTO shaft 97. Also, PTO ring gear 93 has been replaced with a brake wear ring or spacer 293. PTO cover 299 comprises a bolt circle 298 for interchangeable attachment of various equipment modules. This transaxle design therefore permits the transformation of a transaxle including PTO reduction gearing into one without such PTO reduction gearing by means of the simple deletion and exchange of these few components, demonstrating the manufacturing and application versatility of this configuration. Furthermore, other PTO covers (not shown) comprising smaller or larger bolt circles or equipment module mounting patterns other than circular, may be interchangeably substituted in like manner for either of the PTO covers 99 or 299.

A brush cutter module 250 is illustrated in FIGS. 15 and 16 to provide an example of a unique equipment module which may be attached to transaxle 222 in the production of brush cutter vehicle 220. The entire brush cutter module 250 may be preassembled and completely finished prior to its simple attachment to transaxle 222. PTO shaft 97 is engaged to input shaft 254 of brush cutter module 250 with a simple slide-fit coupling 253 which is constrained by the relative positioning of these two shafts when module 250 is attached to transaxle 222. Shaft housing 251 of module 250 is a structural component attached to the PTO cover 299 by a plurality of fasteners 252. Upon attachment of module 250, as shown in FIGS. 15 and 16, shaft housing 251 extends from transaxle 222 to serve as a support structure for the attached brush cutter mowing deck 255.

The brush cutter module 250 configuration also includes right-angle gearbox 260 comprising a main housing, cover, fasteners, shaft bearings, seals, bevel gears and ends of both input shaft 254 and output shaft 258. As shown in FIG. 16, gearbox 260 can include features which interface with an end of shaft housing 251 so that gearbox 260 and shaft housing 251 are interlocked when they are attached to deck 255 by means of fasteners 256 and 261, respectively. This interlocking or slide-fit interface adds structural strength to module 250, precludes operator contact with the rotating shafts located inside shaft housing 251, and prevents excessive wear from environmental contamination of the seals and shaft/coupling mating surfaces which are protected inside shaft housing 251. Brush cutter module 250 also includes a cutting blade 265 and blade attachment hardware which may include a blade adapter (not shown) with one or more shear pins (not shown) to protect gears from damage if, for example, the blade encounters a solid object. Optionally or additionally, one or more shear pins may be incorporated at one or more gearbox 260 bevel gear-to-shaft interfaces. These, of course, would be designed to fail under a load less than that which would cause any significant damage to gear teeth in either of gearbox 260 or transaxle 222. Deck 255 may also comprise a shaft bushing 257 fixed to deck 255 for additional support of output shaft 258, and skids 259 which may be height-adjustable, as shown. Additional guards (not shown) may also be included with module 250 to protect the operator and others from objects propelled by the cutting blade. A skid plate and/or other guards (not shown) may also be attached or integrally added to the external housing of transaxle 222 and/or handle 131 to protect the operator and transaxle 222 and the various linkages and controls of transaxle 222 and vehicle 220, as deemed necessary and desirable for safety and durability. Safety features, such as the aforementioned guards may, of course, vary among different vehicle and equipment applications, and are not described in detail herein.

While certain features of this invention are unique to hydrostatic transaxles, it will be understood that other features are applicable to vehicle drives using other forms of variable speed transmissions. Also, while the drive assemblies depicted herein are shown in connection with a snow thrower using an auger or a brush cutting mower deck, it will be understood that this invention can be used with other driven vehicles or apparatuses.

The transaxle embodiments disclosed herein are designed for the interchangeable attachment of other equipment modules which can be driven by the PTO output. These other equipment modules may include gearing or other speed changing mechanisms specific to their application and function, so that a basic drive assembly embodiment may drive equipment modules of different operating speeds, such as a snow thrower and a mower. For example, the planetary reduction gearing associated with the PTO in the first embodiment could alternatively be included in a snow thrower module (not shown) such that the drive assembly of the second embodiment could drive either this snow thrower module or a brush cutter mowing deck, or it could drive other modules such as, e.g., a wood chipper, mobile generator, finish cut mowing deck, ground working device such as a tiller, etc. These interchangeable modules may include features such as 1:1 gearing, speed reduction gearing, speed increase gearing, or some other PTO output speed change mechanism, either variable or constant, as needed, to provide a proper operating speed or speed range of each module.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

We claim:

1. A drive assembly for use with a prime mover, the drive assembly comprising:
   a housing;
   a center section disposed in the housing and comprising a pump running surface, a motor running surface and hydraulic porting formed in the center section to connect the pump running surface to the motor running surface;
   a pump cylinder block rotatably disposed on the pump running surface;
   a pump shaft engaged to and driven by the prime mover and also engaged to and rotating the pump cylinder block;
   a motor cylinder block rotatably disposed on the motor running surface;
   a motor shaft engaged to and driven by the motor cylinder block;
   a thrust bearing secured to and supported by the center section; and
   a plurality of axial motor pistons disposed in the motor cylinder block, wherein one end of each motor piston engages the thrust bearing.

2. The drive assembly of claim 1, further comprising an axle shaft powered by the motor shaft.

3. The drive assembly of claim 1, wherein the housing comprises an external mounting surface for mounting the prime mover directly on the housing.

4. The drive assembly of claim 1, further comprising a power take-off assembly driven by the pump shaft.

5. The drive assembly of claim 4, wherein the power take-off assembly comprises a power take-off shaft having a first end disposed in and supported by the center section.

6. The drive assembly of claim 1, wherein the pump shaft is supported entirely by the center section.

7. The drive assembly of claim 6, further comprising a first axle shaft and a second axle shaft, wherein each axle shaft comprises a first end disposed external to the housing and a second end supported by the center section.

8. The drive assembly of claim 1, further comprising a first axle shaft and a second axle shaft, wherein each axle shaft comprises a first end disposed external to the housing and a second end supported by a bearing located in the center section.

9. The drive assembly of claim 8, where a first end of the motor shaft is disposed on one side of the center section and a second end of the motor shaft is disposed on a second side of the center section, the drive assembly further comprising:
- a first gear disposed on the first end of the motor shaft and a second gear disposed on a second end of the motor shaft;
- a first gear drive assembly engaged to and driven by the first gear to drive the first axle shaft; and
- a second gear drive assembly engaged to and driven by the second gear to drive the second axle shaft.

10. The drive assembly of claim 9, wherein the first gear drive assembly and the second gear drive assembly each comprise:
- a ring gear comprising an inner surface, an outer surface, a first engagement structure formed on the outer surface and a gear form disposed on the inner surface;
- a planet carrier fixed to one of the axle shafts and comprising a second engagement structure on an outer surface thereof;
- a plurality of planet gears rotatably disposed on the planet carrier and running on the gear form;
- a sun gear engaged to and driving the plurality of planet gears;
- a first dog selectively engageable to the first engagement structure to prevent rotation of the ring gear; and
- a second dog selectively engageable to the second engagement structure to prevent rotation of the planet carrier and thereby provide a braking force to the axle shaft.

11. The drive assembly of claim 9, wherein the first gear drive assembly and the second gear drive assembly each comprise:
- a planet gear assembly comprising a ring gear having a first engagement structure formed on an outer surface thereof and a first engagement means for selectively engaging the first engagement structure to prevent rotation of the ring gear; and
- a planet carrier having a second engagement structure on an outer surface thereof and a second engagement means for selectively engaging the second engagement structure to prevent rotation of the planet carrier and thereby provide a braking force to the axle shaft.

12. A drive assembly for use with a prime mover, the drive assembly comprising:
- a housing;
- a center section disposed in the housing and comprising a pump running surface, a motor running surface and hydraulic porting formed in the center section to connect the pump running surface to the motor running surface;
- a pump cylinder block rotatably disposed on the pump running surface and a motor cylinder block rotatably disposed on the motor running surface;
- a pump shaft engaged to and driven by the prime mover and also engaged to and rotating the pump cylinder block, wherein the pump shaft is entirely supported by the center section; and
- a motor shaft engaged to and driven by the motor cylinder block.

13. The drive assembly of claim 12, further comprising an axle shaft powered by the motor shaft, wherein the axle shaft is at least partially supported by the center section.

14. The drive assembly of claim 12, further comprising a power take-off assembly comprising a power take-off shaft having a first end disposed in and supported by the center section.

15. The drive assembly of claim 12, where a first end of the motor shaft is disposed on one side of the center section and a second end of the motor shaft is disposed on a second side of the center section, the drive assembly further comprising:
- a first gear disposed on the first end of the motor shaft and a second gear disposed on a second end of the motor shaft;
- a first axle shaft and a first gear drive assembly engaged to and driven by the first gear to drive the first axle shaft; and
- a second axle shaft and a second gear drive assembly engaged to and driven by the second gear to drive the second axle shaft.

16. The drive assembly of claim 15, wherein the first gear drive assembly comprises a first engagement mechanism to selectively prevent rotation of the first axle shaft and the second gear drive assembly comprises a second engagement mechanism to selectively prevent rotation of the second axle shaft, and the first and second engagement mechanisms are capable of operating independently.

17. The drive assembly of claim 15, wherein the first axle shaft is supported by a first bearing in the center section and the second axle shaft is supported by a second bearing in the center section.

18. A drive assembly for use with a prime mover, the drive assembly comprising:
- a housing;
- a center section disposed in the housing and comprising a pump running surface, a motor running surface and hydraulic porting formed in the center section to connect the pump running surface to the motor running surface;
- a pump cylinder block rotatably disposed on the pump running surface and a motor cylinder block rotatably disposed on the motor running surface;
- a pump shaft engaged to and driven by the prime mover and also engaged to and rotating the pump cylinder block and a motor shaft engaged to and driven by the motor cylinder block;
- a first axle shaft and a second axle shaft, wherein each axle shaft comprises a first end disposed external to the housing and a second end supported by a hearing located in the center section.

19. The drive assembly of claim 18, where a first end of the motor shaft is disposed on one side of the center section and a second end of the motor shaft is disposed on a second side of the center section, the drive assembly further comprising:
- a first gear disposed on the first end of the motor shaft and a second gear disposed on a second end of the motor shaft;
- a first gear drive assembly engaged to and driven by the first gear to drive the first axle shaft; and
- a second gear drive assembly engaged to and driven by the second gear to drive the second axle shaft.

20. The drive assembly of claim 19, wherein the first gear drive assembly comprises a first engagement mechanism to selectively prevent rotation of the first axle shaft and the second gear drive assembly comprises a second engagement mechanism to selectively prevent rotation of the second axle shaft, and the first and second engagement mechanisms are capable of operating independently.

21. The drive assembly of claim 18, further comprising a power take-off assembly comprising a power take-off shaft having a first end disposed in and supported by the center section.

22. The drive assembly of claim 18, wherein the pump shaft is supported entirely by the center section.

23. A drive assembly for use with a prime mover, the drive assembly comprising:
- a housing;
- a center section disposed in the housing;
- a pump cylinder block and a motor cylinder block both located in the housing and rotatably disposed on the center section;
- a pump shaft engaged to and driven by the prime mover and also engaged to and rotating the pump cylinder block and a motor shaft engaged to and driven by the motor cylinder block; and
- a power take-off assembly comprising a power take-off shaft having a first end disposed in and supported by the center section.

24. The drive assembly of claim 23, where a first end of the motor shaft is disposed on one side of the center section and a second end of the motor shaft is disposed on a second side of the center section, the drive assembly further comprising:
- a first gear disposed on the first end of the motor shaft and a second gear disposed on a second end of the motor shaft;
- a first axle shaft and a first gear drive assembly engaged to and driven by the first gear to drive the first axle shaft; and
- a second axle shaft and a second gear drive assembly engaged to and driven by the second gear to drive the second axle shaft.

25. The drive assembly of claim 24, wherein the first gear drive assembly comprises a first engagement mechanism to selectively prevent rotation of the first axle shaft and the second gear drive assembly comprises a second engagement mechanism to selectively prevent rotation of the second axle shaft, and the first and second engagement mechanisms are capable of operating independently.

* * * * *

UNITED STATES PATENT AND TRADEMARK OFFICE
CERTIFICATE OF CORRECTION

PATENT NO. : 8,313,408 B1  
APPLICATION NO. : 12/717709  
DATED : November 20, 2012  
INVENTOR(S) : Thomas J. Langenfeld Page 1 of 1

It is certified that error appears in the above-identified patent and that said Letters Patent is hereby corrected as shown below:

In the Claims

In Claim 18, Column 10, Line 47 replace "hearing" with --bearing--.

Signed and Sealed this
Twenty-fourth Day of June, 2014

Michelle K. Lee
*Deputy Director of the United States Patent and Trademark Office*